US011507909B2

(12) United States Patent
Jones et al.

(10) Patent No.: US 11,507,909 B2
(45) Date of Patent: Nov. 22, 2022

(54) OFFENDER ELECTRONIC MONITORING PROGRAM COMPLIANCE ASSESSMENT AND PROGRAM REVISION

(71) Applicant: Talitrix Holdings, LLC, Alpharetta, GA (US)

(72) Inventors: Robert Todd Jones, Cumming, GA (US); Eric Brice Bennett, Cumming, GA (US); Justin T. Hawkins, Cumming, GA (US)

(73) Assignee: Talitrix Holdings, LLC, Alpharetta, GA (US)

( * ) Notice: Subject to any disclaimer, the term of this patent is extended or adjusted under 35 U.S.C. 154(b) by 0 days.

(21) Appl. No.: 17/326,085

(22) Filed: May 20, 2021

(65) Prior Publication Data

US 2021/0365865 A1 Nov. 25, 2021

Related U.S. Application Data

(60) Provisional application No. 63/028,385, filed on May 21, 2020.

(51) Int. Cl.
*G06Q 10/06* (2012.01)
*H04W 4/021* (2018.01)
(Continued)

(52) U.S. Cl.
CPC ...... *G06Q 10/06393* (2013.01); *H04W 4/021* (2013.01); *H04W 4/38* (2018.02); *H04W 36/06* (2013.01); *H04W 72/0453* (2013.01)

(58) Field of Classification Search
CPC .... G08B 21/22; G08B 21/0225; G08B 25/00; G08B 25/016; G08B 21/0453;
(Continued)

(56) References Cited

U.S. PATENT DOCUMENTS 4,952,928 A * 8/1990 Carroll ............... G07C 9/28
340/10.41
5,189,395 A * 2/1993 Mitchell ............. G08B 21/22
340/531

(Continued)

FOREIGN PATENT DOCUMENTS

WO 2021236960 11/2021

OTHER PUBLICATIONS

Sierra Wireless; Article entitled: "Electronic Monitoring for Pretrial Offenders", published Mar. 25, 2020, 10 pgs.

(Continued)

*Primary Examiner* — Scott L Jarrett
(74) *Attorney, Agent, or Firm* — Pillsbury Winthrop Shaw Pittman LLP; Christopher L. Drymalla

(57) ABSTRACT

An electronic monitoring device and system uses a wearable monitoring device in conjunction with an associated smartphone's location services to track a person's location. Cameras or biometric sensors associated with the smartphone allow incremental responses to apparent violations by requiring the wearer to check-in using a photograph, biometric data, GPS location, and other relevant information. The system optimizes compliance by tracking KPIs and using predictive analytics to adjust compliance programs as they apply to client throughout the system.

17 Claims, 10 Drawing Sheets

(51) Int. Cl.
*H04W 4/38* (2018.01)
*H04W 72/04* (2009.01)
*H04W 36/06* (2009.01)

(58) Field of Classification Search
CPC ........... G08B 21/0261; G08B 21/0423; H04W 24/10; H04W 12/63; H04W 12/64; H04W 4/02; H04W 4/029; H04W 4/021; G06Q 10/1091; G06Q 50/265; G06Q 50/26
See application file for complete search history.

(56) References Cited

U.S. PATENT DOCUMENTS

| | | | | |
|---|---|---|---|---|
| 5,204,670 | A * | 4/1993 | Stinton | G08B 21/0227 340/10.5 |
| 5,369,699 | A * | 11/1994 | Page | A61B 5/0531 379/38 |
| 5,982,281 | A * | 11/1999 | Layson, Jr. | G07C 9/28 340/539.13 |
| 6,054,928 | A * | 4/2000 | Lemelson | G08B 21/0469 455/100 |
| 6,072,396 | A * | 6/2000 | Gaukel | B60R 25/102 340/573.4 |
| 6,239,700 | B1 | 5/2001 | Hoffman et al. | |
| 6,437,696 | B1 * | 8/2002 | Lemelson | G07C 9/28 340/8.1 |
| 6,463,127 | B1 * | 10/2002 | Maier | G07C 9/37 379/38 |
| 6,639,516 | B1 | 10/2003 | Copley | |
| 6,774,799 | B2 | 8/2004 | Defant et al. | |
| 6,838,998 | B1 | 1/2005 | Brown et al. | |
| 7,123,141 | B2 * | 10/2006 | Contestabile | G08B 21/0269 340/539.13 |
| 7,446,656 | B2 | 11/2008 | Blakeway | |
| 7,456,355 | B2 | 11/2008 | Blakeway | |
| 7,522,060 | B1 * | 4/2009 | Tumperi | G06Q 50/26 340/573.4 |
| 7,590,232 | B2 | 9/2009 | Carter et al. | |
| 8,493,219 | B2 | 7/2013 | Buck et al. | |
| 8,862,152 | B1 | 10/2014 | Buchholz et al. | |
| 9,064,391 | B2 | 6/2015 | Vardi et al. | |
| 9,456,301 | B2 * | 9/2016 | Thompson | H04W 4/20 |
| 9,489,819 | B2 * | 11/2016 | Hughes | H04W 4/029 |
| 9,877,172 | B1 * | 1/2018 | Scheppegrell | H04W 4/02 |
| 9,990,826 | B1 * | 6/2018 | Hodge | G08B 21/22 |
| 9,990,831 | B2 | 6/2018 | Keyton | |
| 10,075,541 | B2 * | 9/2018 | Layson | G06F 3/0484 |
| 10,109,173 | B2 * | 10/2018 | Keyton | G08B 21/0286 |
| 10,255,789 | B2 | 4/2019 | Keyton | |
| 10,375,187 | B1 * | 8/2019 | Marlin | G10L 15/22 |
| 10,477,342 | B2 * | 11/2019 | Williams | A63F 9/12 |
| 10,565,851 | B2 * | 2/2020 | Hodge | G08B 21/22 |
| 10,706,288 | B1 * | 7/2020 | Magaletta | H04M 3/2281 |
| 10,735,576 | B1 * | 8/2020 | Noonan | H04W 4/029 |
| 10,820,143 | B2 * | 10/2020 | Segal | H04W 4/20 |
| 11,062,584 | B1 * | 7/2021 | Magaletta | G04G 21/025 |
| 11,069,218 | B2 * | 7/2021 | Hodge | G08B 21/22 |
| 11,087,607 | B2 * | 8/2021 | Gandrud | G08B 21/0261 |
| 11,087,608 | B2 * | 8/2021 | Gandrud | G08B 7/06 |
| 11,195,403 | B2 * | 12/2021 | Gandrud | A61B 5/6829 |
| 11,216,900 | B1 * | 1/2022 | Galyean | G06Q 50/26 |
| 11,282,360 | B2 * | 3/2022 | Gandrud | G08B 21/0269 |
| 11,393,319 | B1 * | 7/2022 | Maisano, II | G08B 21/043 |
| 2002/0067272 | A1 * | 6/2002 | Lemelson | G08B 21/0233 340/573.4 |
| 2005/0116811 | A1 | 6/2005 | Eros | |
| 2005/0285747 | A1 | 12/2005 | Kozlay | |
| 2007/0013527 | A1 * | 1/2007 | Sloan | G06Q 30/02 340/573.4 |
| 2007/0023496 | A1 * | 2/2007 | Hall | G07C 9/28 235/375 |
| 2007/0273537 | A1 * | 11/2007 | Crespo | B60K 28/063 340/576 |
| 2009/0212957 | A1 * | 8/2009 | Burris | A61B 5/4266 340/573.4 |
| 2011/0148626 | A1 * | 6/2011 | Acevedo | G01S 5/0027 340/539.13 |
| 2012/0050532 | A1 | 3/2012 | Rhyins | |
| 2014/0159905 | A1 * | 6/2014 | Thompson | H04W 4/029 340/573.4 |
| 2014/0344277 | A1 * | 11/2014 | Layson | G06F 16/29 707/737 |
| 2015/0077247 | A1 | 3/2015 | Curatolo et al. | |
| 2015/0123766 | A1 * | 5/2015 | St. John | H04L 63/0861 340/5.84 |
| 2016/0021535 | A1 | 1/2016 | Tali et al. | |
| 2016/0092685 | A1 * | 3/2016 | Tse | G06F 21/6218 726/1 |
| 2016/0110987 | A1 * | 4/2016 | Hughes | H04W 4/029 340/573.4 |
| 2016/0116596 | A1 * | 4/2016 | Rajala | G08B 21/02 342/357.54 |
| 2016/0117909 | A1 * | 4/2016 | Rajala | G08B 21/22 340/573.4 |
| 2016/0117910 | A1 * | 4/2016 | Rajala | H04W 4/021 340/539.13 |
| 2016/0165569 | A1 * | 6/2016 | Rajala | H04W 4/02 455/456.2 |
| 2016/0309122 | A1 * | 10/2016 | Kingery | G06K 9/00892 |
| 2016/0379105 | A1 * | 12/2016 | Moore, Jr | G06F 21/316 706/11 |
| 2017/0162031 | A1 * | 6/2017 | Drolshagen | G06K 9/00892 |
| 2017/0293989 | A1 * | 10/2017 | Hodge | G06Q 50/26 |
| 2017/0372389 | A1 * | 12/2017 | Busch | G06Q 40/12 |
| 2018/0124565 | A1 * | 5/2018 | Villani | A01K 15/023 |
| 2018/0158304 | A1 * | 6/2018 | Hodge | G08B 21/22 |
| 2018/0176727 | A1 * | 6/2018 | Williams | A61B 5/6802 |
| 2018/0365779 | A1 * | 12/2018 | Hodge | G06Q 50/26 |
| 2018/0365966 | A1 * | 12/2018 | Hodge | G08B 21/22 |
| 2019/0005795 | A1 | 1/2019 | Keyton | |
| 2019/0130733 | A1 * | 5/2019 | Hodge | G06V 20/20 |
| 2019/0206221 | A1 | 7/2019 | Buck, Jr. et al. | |
| 2019/0213861 | A1 * | 7/2019 | Hughes | H04L 1/20 |
| 2019/0230170 | A1 * | 7/2019 | Marlin | G06F 16/9535 |
| 2019/0266877 | A1 | 8/2019 | Keyton | |
| 2019/0340906 | A1 * | 11/2019 | Williams | G08B 21/0269 |
| 2020/0154232 | A1 * | 5/2020 | Segal | G01S 19/14 |
| 2020/0234560 | A1 * | 7/2020 | Hodge | G08B 21/22 |
| 2020/0252752 | A1 * | 8/2020 | Gandrud | H04W 4/029 |
| 2020/0334968 | A1 * | 10/2020 | Manne | G08B 21/0261 |
| 2020/0410836 | A1 * | 12/2020 | Trunzo | G08B 21/0283 |
| 2021/0104142 | A1 * | 4/2021 | Gandrud | G08B 21/0288 |
| 2021/0104143 | A1 * | 4/2021 | Gandrud | G08B 7/06 |
| 2021/0150870 | A1 * | 5/2021 | Gandrud | G01C 17/02 |
| 2021/0200808 | A1 * | 7/2021 | Shi | H04W 4/02 |
| 2022/0012996 | A1 * | 1/2022 | Gandrud | G08B 21/0236 |

OTHER PUBLICATIONS

Sierra Wireless; Case study entitled: "Tracking Pretrial Offenders with the Omnilink Solution Helps Deter Repeat Offenses and Solve Crimes Faster", published Feb. 16, 2018, 4 pgs.
wired.com; Article entitled: "Ankle Monitors Aren't Humane. They're Another Kind of Jail", located at <https://www.wired.com/story/opinion-ankle-monitors-are-another-kind-of-jail/>, published Aug. 4, 2018, 4 pgs.
Talk Business & Politics; Article entitled: "Patent owner hopes 'House Arrest' iPhone app replaces ankle bracelets", located at <https://talkbusiness.net/2015/03/patent-owner-hopes-house-arrest-iphone-app-replaces-ankle-bracelets/>, published Mar. 12, 2015, 4 pgs.
Scram Systems; Article entitled: "Smartphone-based supervision and engagement tool for probation, parole, pretrial and treatment court clients", available as early as May 5, 2021, 2 pgs.
Scram Systems; Article entitled: "GPS location monitoring and analytics that remove the guesswork", available as early as Apr. 26, 2021, 2 pgs.

(56) References Cited

OTHER PUBLICATIONS

GPS Monitoring Solutions, Inc.; Article entitled: "GPS Monitoring Solutions Inc. provides the following services to Courts, Probation Departments, Attorneys, and Bail Agencies:", available as early as Aug. 4, 2020, 8 pgs.
Jones, Robert Todd; International Search Report and Written Opinion for PCT Application No. PCT/US21/33460, filed May 20, 2021, dated Aug. 24, 2021, 13 pgs.

* cited by examiner

OFFENDER ELECTRONIC MONITORING PROGRAM COMPLIANCE ASSESSMENT AND PROGRAM REVISION

CROSS-REFERENCE TO RELATED APPLICATIONS

This application claims the benefit of provisional application 63/028,385, filed May 21, 2020, and entitled "Electronic Monitor with Biometric Check-In."

TECHNICAL FIELD

This disclosure relates to electronic monitoring systems that use smartphones, wristbands, ankle monitors and other devices to monitor a person's location. More specifically, this disclosure relates to an improved electronic monitoring system that gathers and analyzes compliance-related KPIs in order to optimize client compliance.

BRIEF SUMMARY

The present disclosure relates to technologies associated with the electronic monitoring of individuals, including monitoring their location and other metrics, such as certain health indicators like heart rate, oxygen saturation and related indicators. Monitored individuals may include, but are not limited to, those in the criminal justice system who are awaiting trial or participating in pre-trial intervention, or subject to supervised release, house arrest or incarceration, asylum applicants pending adjudication of their claims or other individuals subject to locational monitoring for any reason. The system employs a client monitoring device, which may include a smartphone, a wearable monitoring device that is paired with a smartphone, or a standalone wearable monitoring device that is capable of independently receiving Global Positioning System (GPS) signals and communicating with the monitoring system. An app running on a smartphone may employ the smartphone's camera, biometric sensors (if available), and location services to track the wearer's location, health metrics, and identity and to report location, noncompliance, or other conditions to a supervising authority. The camera and biometric check-in capabilities allow the supervising authority to verify the tracked person's identity and location and may be used to mitigate false alarms associated with equipment failure and other circumstances. Similar biometric capabilities may be embedded in a wearable monitoring device, whether or not paired with a smartphone. The wearable monitoring device and smartphone, when paired or used together, offer redundancy such that when one of the devices goes offline, the other remains functioning to provide the required metrics to the system.

In one embodiment, the present disclosure describes a method for optimizing the compliance of a tracked person. The process begins by receiving profile information that is associated with the tracked person and which identifies a client device for transmitting information between the monitoring system and the tracked person. The method establishes a compliance program for the tracked person. The compliance program includes location-related events, equipment-related events, and check-in-related events, along with the assignment of a supervisor associated with the tracked person. The method also calculates an acceptable compliance score based on the profile information and the location-related events, equipment-related events, and check-in-related events associated with the compliance program.

After the initial steps, the method receives location-related information from the client device and determines whether the location-related information indicates a location-related violation. The method also receives equipment-related information from the client device and determines whether the equipment-related information indicates an equipment-related violation. The method also notifies the tracked person of check-in-related events and determines if the tracked person has missed a check-in-related event that resulted in a check-in-related violation.

After sufficient information has been collected, the method assesses the location-related violations, equipment-related violations, and check-in-related violations associated with the tracked individual and calculates a compliance score. In response to the compliance score falling below the acceptable compliance score, the compliance program is revised by changing at least one of the location-related events, equipment-related events, and/or check-in-related events associated with the compliance program.

Various implementations described in the present disclosure can comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure. The features and advantages of such implementations can be realized and obtained by means of the systems, methods, and features particularly pointed out in the appended claims. These and other features will become more fully apparent from the following description and appended claims, or can be learned by the practice of such exemplary implementations as set forth hereinafter.

BRIEF DESCRIPTION OF THE DRAWINGS

In the following Detailed Description, references are made to the accompanying drawings, which form a part hereof, and show, by way of illustration, specific embodiments or examples. The features and components of the following figures are illustrated to emphasize the general principles of the present disclosure. The drawings herein are not drawn to scale. Like numerals represent like elements throughout the several figures.

DETAILED DESCRIPTION

Figure 1:
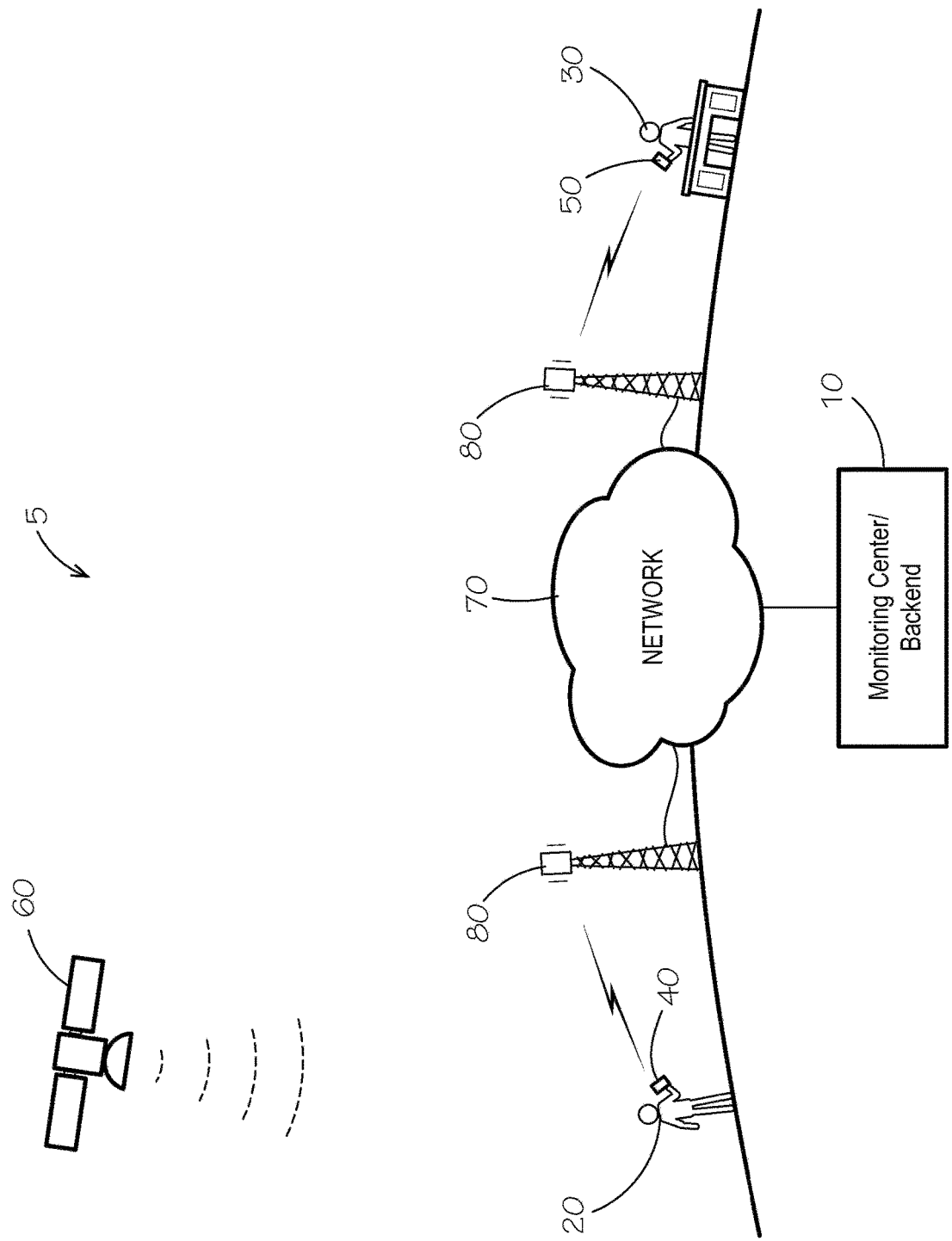
FIG. 1 is an overview of an electronic monitoring system for tracking the location of individuals and reporting that information to their supervisors.

The present disclosure can be understood more readily by reference to the following detailed description, examples, drawings, and claims, and their previous and following descriptions. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently-known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

The following detailed description is directed to technologies associated with the electronic monitoring of the location of people, such as those whose freedom of movement has been limited or restricted by the criminal justice or immigration enforcement systems.

Electronic monitors may be used in a variety of circumstances. For example, they may be a condition for supervised release in the criminal justice system, such as probation, parole, pre-trial release, etc. or they may be used to track immigrants awaiting asylum or deportation proceedings. They may also be used when a person is subject to a restraining or protection order that requires them to stay away from a specific person or location or within a designated perimeter. Law enforcement's use of electronic monitors more than doubled between 2005 and 2015 and their use may continue to increase as pressure to reduce incarceration grows due to budget, health, safety, political or other concerns.

Although electronic monitoring systems are traditionally used in the context of the criminal justice system, the monitoring system described herein may also be used in other use scenarios or use cases. One example of another use case is immigration enforcement, where U.S. Immigration and Customs Enforcement may choose to monitor people who have not been charged with a crime and have been released while they await their asylum or deportation hearings. Another example is the military, police departments and fire departments where a commander or unit may want to track personnel who are deployed in various settings. Similar systems, when used in the context of the military, are sometimes referred to as blue force trackers. It is also possible that other enterprises, such as schools, retirement homes, memory care facilities, or similar facilities may want to use tracking and monitoring devices to monitor individuals when they take a class or group out on a field trip.

The most common type of electronic monitors are ankle bracelets that are securely attached to the client. If used for home confinement, the electronic monitor may communicate with a base station located at the client's home. The base station may communicate with the monitoring authorities over landline telephone or other technology. If the client is allowed to move about to go to work, counseling, treatment, etc., the ankle monitor may include a GPS receiver and cellular connection, which is used to report the client's location to the monitoring authorities.

Current electronic monitors experience false alarms, which can result the police or other law enforcement officers being dispatched and the client being sent back to jail. For example, if the connection between the monitor and the base station is broken for any reason (including, for example, some household item or feature that temporarily interferes with the signal), the base station may send an alert to the monitoring authorities, who may then dispatch police to investigate. They also are cumbersome to recharge, requiring monitored individuals to remain stationary for extended period of time while a wire is connected to an electrical outlet, potentially resulting in more incidents of equipment faults (and a corresponding alert to the monitoring authorities) due to dead batteries. At the very least, these events result in a waste of law enforcement resources. At worst, it may result in the arrest and reincarceration of the client though he or she never left their home. Current monitors are bulky also create a stigma for the wearers and may interfere with occupational activities or clothing/uniform requirements for certain occupations.

Current electronic monitors that incorporate GPS receivers can report the client's position to the monitoring authorities. If there is some malfunction or mistake, the belief that the client is somewhere that he or she is not permitted to be, or not where he or she is required to be, can result in a false alarm and the dispatching of law enforcement.

In most cases, a client is charged a fee for the electronic monitor and the cost of monitoring it. This can range from $5 to $25 per day. In some cases, it also requires the client to have a landline telephone, which imposes an additional expense. Non-payment of these fees may result in the client being returned to jail.

In addition, current electronic monitors assume that the location of the monitoring device coincides with the location of the client. This is usually the case since it is difficult to remove the monitors without setting off a built-in alarm. However, it would be advantageous to be able to verify the client's identity and his or her proximity to the electronic monitor from time to time or in specific circumstances.

In light of the demand for electronic monitors and the shortcomings of current technologies, it is desirable to provide an electronic monitoring system that reduces or eliminates false alarms, allows the client to use photo or biometric check-in to confirm their status and to mitigate a false alarm, reduces the cost associated with traditional systems and devices and mitigates the stigma associated with current electronic monitors. It is also desirable to have the ability for third parties (such as crime victims) to opt in and be informed of their proximity to the client in some cases.

The hardware-related capabilities of the subject monitoring system may be employed in various combinations and on various schedules to create a specifically-tailored compliance program for each tracked individual. If we consider the use of such a system in the criminal justice use case, for example, it is apparent that all clients do not need to be treated the same. Some clients, particularly those accused or convicted of more serious crimes, may require closer monitoring, and less benefit-of-the-doubt when it comes to possible violations than someone accused or convicted of a fairly minor or non-violent crime. A tracked person's record of compliance (i.e., past performance) can also be considered by the supervising authority. These factors, and others, can be taken into account to formulate a compliance program for each tracked person.

For example, some compliance programs may require the tracked person to perform a photo check-in daily or multiple times per day, while others may require it only once per week. Some compliance programs may require phone or video check-ins or in-person meetings along with the regular photo check-ins. It is also possible for the monitoring system to program a number of ad hoc, or unscheduled, check-ins over a certain period of time or to use voice recognition capability to authenticate a client's identity.

Those familiar with the field will recognize that a tracked person's initial compliance program may be too strict in some cases, and not strict enough in others. If too strict, it wastes the time of the monitored person and his or her supervisor with unnecessary check-ins and other tasks. If not strict enough, it may allow a monitored person to test the system in ways that eventually lead to full-blown non-compliance or violation. Because monitored persons and their supervisors all have different personalities, it is possible that compliance can be improved simply by assigning the monitored person to a new supervisor with whom they might develop a better working relationship.

Consequently, it is desirable to be able to adjust a monitored person's compliance plan over time as the supervisor and the monitoring system collect data about the monitored person's compliance. Several metrics, or key performance indicators (KPIs) are believed to be helpful in this regard. Three important categories of KPIs includes location-related events, equipment-related events, and check-in related events.

Location-related events measure the tracked person's compliance with established geographic restrictions. For example, a tracked person may be required to be at work during working hours and at home during all other hours, except for some transit time. In addition, there may be restricted zones that a tracked person must avoid at all times. Thus, a monitoring system may track metrics such as work curfew violations (when a person is not at work when he is supposed to be), home curfew violations (when a person is not at home when he is supposed to be), and restricted zone violations (when a person is somewhere he is not supposed to be, such as package stores, adult entertainment venues or schools or within a restricted perimeter set up under an order of protection for a victim).

Equipment-related events pertain to the client device that is used to monitor the client. Since the client devices are mobile and run on batteries, it is imperative that the monitored person keep the devices charged. If the monitored person, or client, is wearing a wristband or ankle monitor that is permanently attached and tamper proof, it is imperative that the client not tamper with or try to remove the device. Thus, a monitoring system may track metrics such as band tamper violations, phone battery violations, and band battery violations.

Check-in-related events pertain to how and when a client is required to check-in with his or her supervisor or with the monitoring system. Thus, a monitoring system may track metrics such as photo check-in violations (when the client fails to respond to a scheduled or ad hoc photo check-in request), call violations (when the client misses a scheduled call with his supervisor), and live appointment violations (when the client misses a scheduled meeting with this supervisor).

As these metrics are monitored and a client's compliance is observed over time, it may become apparent that the client's compliance program should be revised. For example, if a client begins missing check-ins, the compliance program may be revised to include more frequent scheduled check-ins, more ad hoc check-ins, or more phone or in person check-ins. Similarly, if a client's compliance is very high, it may be reasonable to reduce the number of check-ins or interactions required. It is also possible that a judge or other administrative authority would consider the client's compliance score when deciding whether or not to release the client from the monitoring requirement.

Turning now to the drawing figures, FIG. 1 provides an overview of an electronic monitoring system 5 with KPI-based optimization. The system 5 includes a monitoring center/backend 10 that is capable of tracking a client 20 and reporting the client's location and other information to a supervisor 30. The system tracks and communicates with the client 20 via client device 40 and communicates with the supervisor 30 via supervisor device 50. GPS satellites 60 provide location signals that allow the client device 40 to determine its location and report its location to the monitoring center 10. The client device 40, supervisor device 50, and monitoring center 10 communicate with each other via a network 70, which may include the Internet and other telecommunications networks. Because the client device 40 and supervisor device 50 may be mobile, they are capable of communicating with the network 70 via cellular towers 80 or other wireless or wired networks. The use of multiple communication modalities creates built-in redundancy in case one or two of the modalities are unavailable at a given time.

Figure 2:
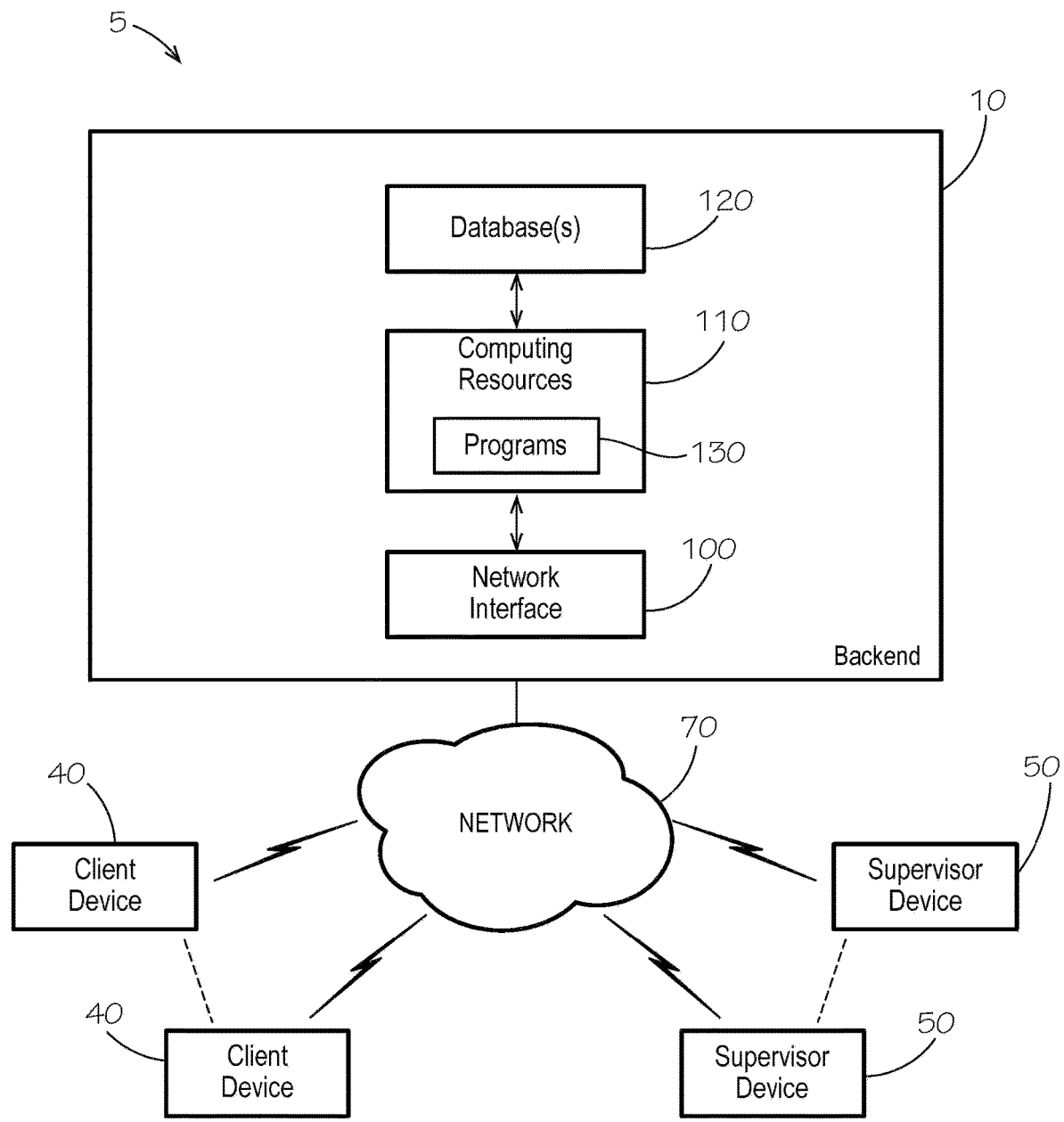
FIG. 2 is a block diagram illustrating various elements of the electronic monitoring system shown in FIG. 1.

FIG. 2 is another representation of the electronic monitoring system 5 for tracking individuals. As illustrated in FIG. 1, a plurality of client devices 40 and a plurality of supervisor devices 50 communicate with the monitoring center/backend 10 via network 70. Generally speaking, the monitoring system/backend 10 includes a network interface 100, computing resources 110 and one or more databases 120. The computing resources 110 are capable of executing programs 130 in order to carry out the functions of the system. The databases 120 may be used to store information needed to run the system, including client profile data, stored location data, geo-location and geo-fencing data, and the programs that are executed by the computing resources 110. The computing resources 110, databases 120, and other resources may be implemented in cloud environments, such as those provided by Amazon Web Services, Microsoft Azure, Google Cloud, and others.

Figure 3:
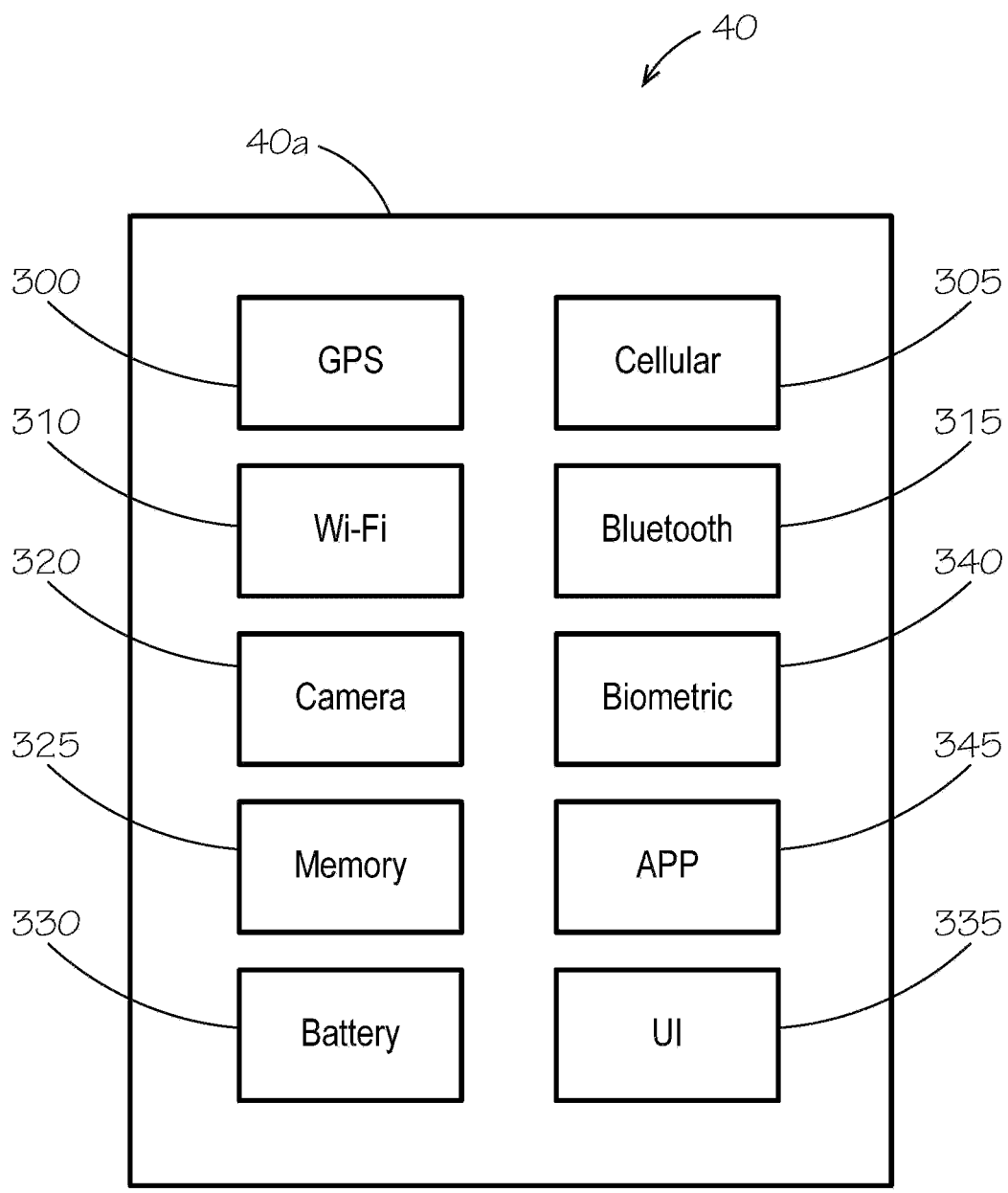
FIG. 3 is a block diagram of a smartphone that may form a part of a client device used in the electronic monitoring system of FIG. 1.

FIGS. 3-7 illustrate several examples of client device 40. In FIG. 3, client device 40 is a smartphone 40a, such as an Apple iPhone or a smartphone running the Android operating system. In this example, the client device 40 consists solely of the smartphone and does not include a paired wristband, ankle bracelet or other wearable tracking device. In this example, the primary components of the client device 40 include a GPS receiver 300, a cellular radio 305 compatible with current cellular network technologies, such as 4G and 5G, and a Wi-Fi radio 310. The GPS receiver 300, cellular radio 305 and Wi-Fi radio 310 allow the client device 40 to receive location data and transmit it, along with other information, to the monitoring center/backend 10. The Wi-Fi capability may be useful indoors where cellular service is unavailable or unreliable. Wi-Fi is also useful if a client is restricted to indoors, such as a prison or hospital, and allows the client device to communicate with the monitoring system/backend 10 without the need for a separate cellular account or subscription.

Like most smartphones, client device 40 also includes Bluetooth 315, a camera 320, memory 325, a rechargeable battery 330, and a user interface 335, such as a touch screen. The client device 40 may also include one or more biometric sensors 340, such as a fingerprint reader, iris scanner, or other device. The client device also includes a monitoring app 345, which is configured to communicate with the monitoring center/backend 10 and provide the user interface 335 and other functionality required for the client.

Figure 4:
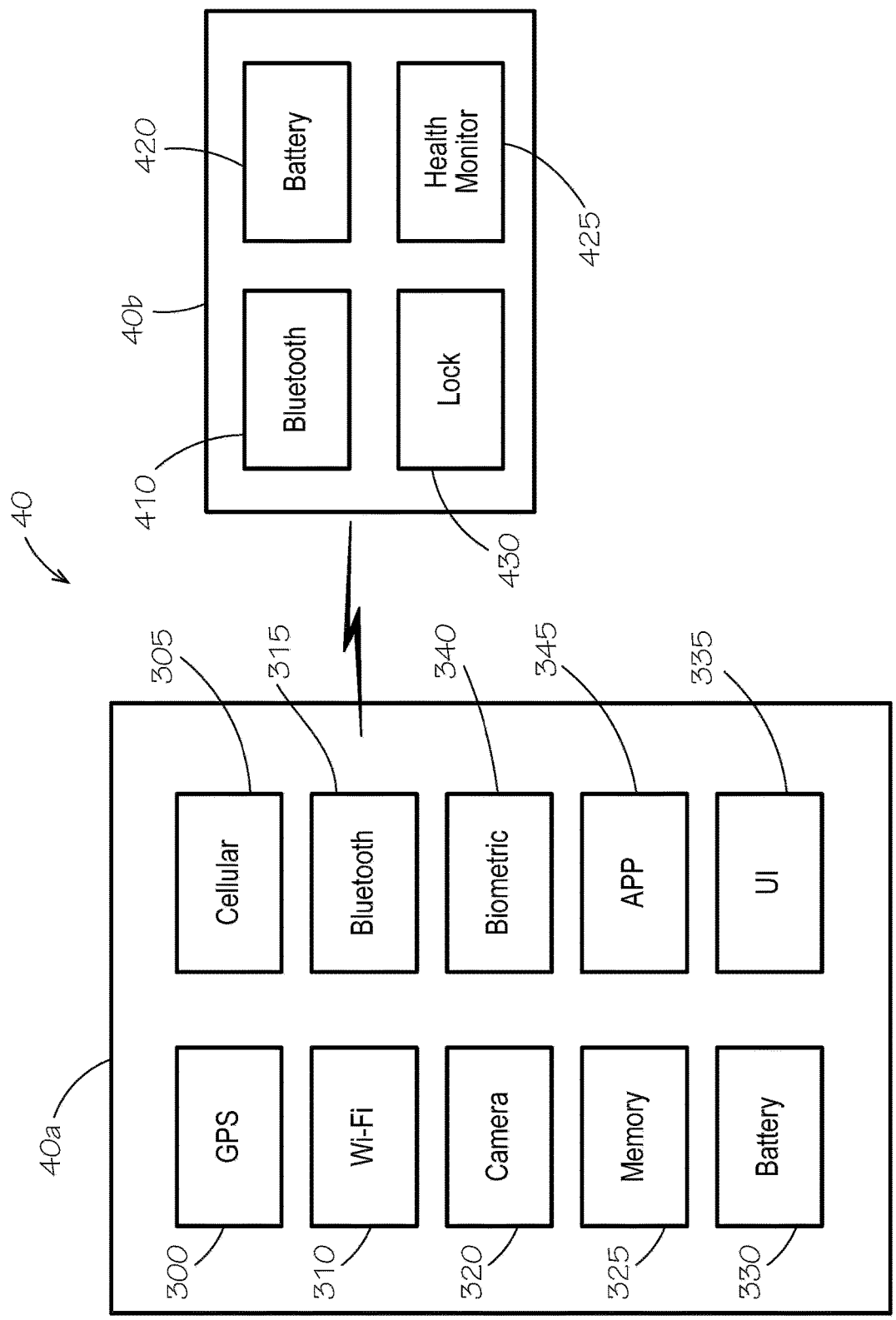
FIG. 4 is a block diagram of a client device that includes a smartphone and a paired wristband or ankle monitor.

In FIG. 4, client device 40 is a smartphone 40a that is paired with a wristband 40b. As in FIG. 3, the smartphone 40a may include a GPS receiver 300, a cellular radio 305, a Wi-Fi radio 310, Bluetooth capability 315, a camera 320, biometric sensors 340, memory 325, the monitoring app 345, a battery 330, and a user interface 335. The band 40b includes Bluetooth capability 410 so it can be paired with the smartphone 40a and may also include health monitors such as a heart rate monitor, oxygen saturation monitors, and electrocardiogram (EKG). As discussed in more detail in conjunction with FIG. 5, a wristband may also include a cellular radio and GPS receiver such as are available in the smartphone 340. The wristband 40b also includes a battery 420 and a lock 430 that prevents the user from removing the band. In this configuration, the smartphone is used to determine the client's location, while the band ensures that the client stays in close proximity to the smartphone. The client device 40b may be programmed to send a notification to the monitoring system 10 if the band 40b is tampered with or out of range of the smartphone 40a.

Those skilled in the art will appreciate that supervisor device 50 may consist of a smartphone like that described above, though the supervisor device would run a supervisory app that is different from the client app that is run on the client device 40. Alternately, a supervisor device may under some circumstances include a desktop or laptop computer running a supervisory app or accessing a web-based supervisory service.

The client device 40 that includes smartphone 40a and band 40b may be used with clients who are subject to the criminal justice system and whose freedom of movement has been curtailed or limited as part of the terms of supervised release, such as probation, parole, pre-trial release, house arrest, restraining order, etc. The band 40b that is attached to the client may be an ankle monitor, a wristband, or some other type of device that may be attached to the client in a manner that prevents it from being removed without authorization of the supervising authorities. If the device is tampered with or removed without authorization, it may set off an alarm or send a notification to the supervising authorities. This may also initiate the check-in process to ensure that the client remains with the smartphone, as further described below.

The smartphone 40a and the band 40b may be connected by a wireless technology such as Bluetooth, Bluetooth Low Energy (BLE), Wi-Fi, near-field communications (NFC), or other suitable technology.

Figure 5:
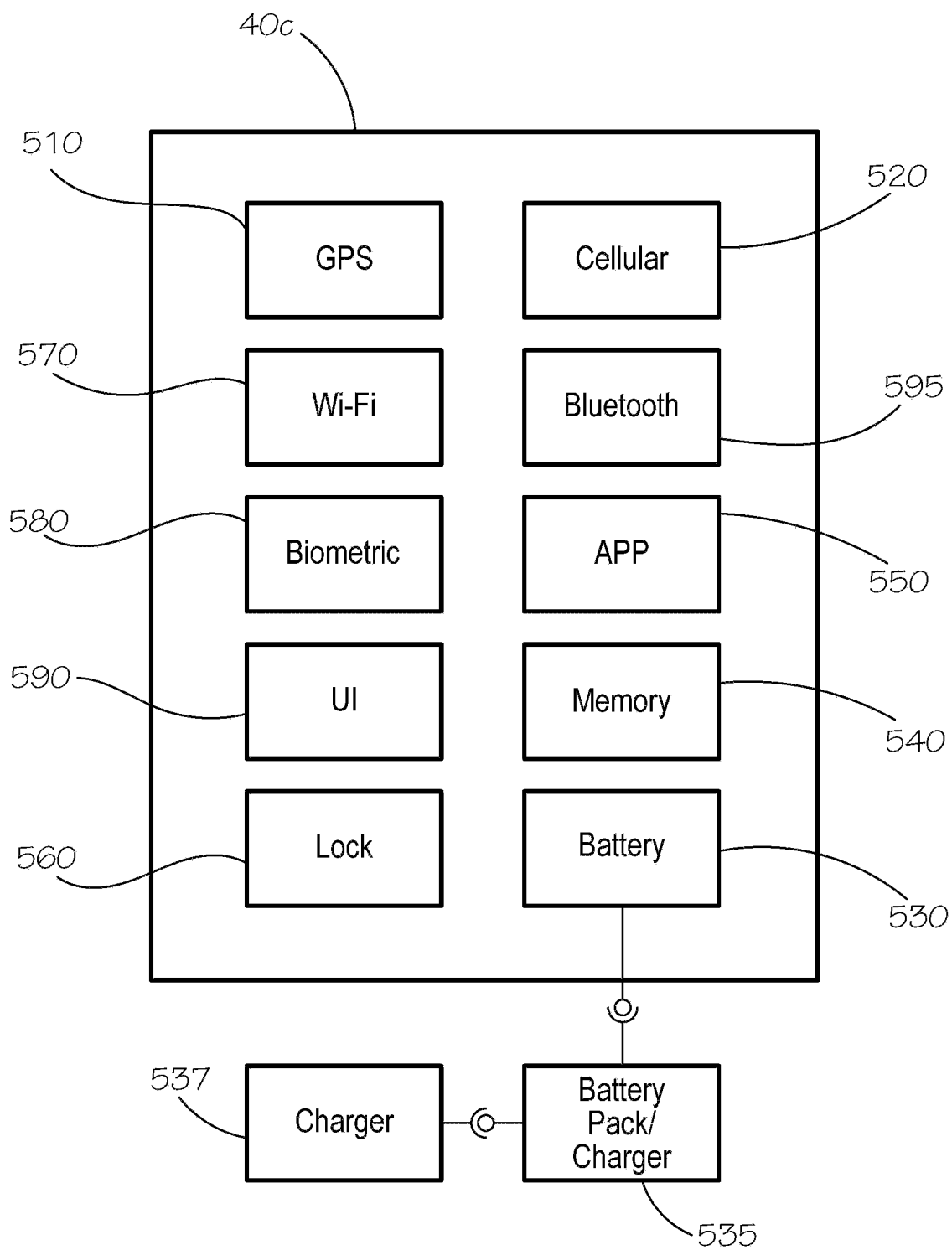
FIG. 5 is a block diagram of a client device that consists of a standalone wristband or ankle monitor.

In FIG. 5, the client device 40 is a standalone wristband 40c. The standalone wristband 40c is able to receive location data and communicate with the monitoring center/backend 10 without being paired with a smartphone. Standalone wristband 40c includes a GPS receiver 510 and a cellular radio 520 similar to those found in smartphone 40a. The wristband 40c also includes a rechargeable battery 530, memory 540, and an application program 550 that enables the wristband 40c to process information such as location information and communicate with the monitoring center/backend 10. The band also includes a tamper-proof lock 560 of the type described above and a battery pack/charger 535 that may itself be a battery that can be charged using a separate charger 537 and then clipped onto the band so that client or supervisor does not lose mobility while the band battery is being recharged.

The standalone wristband may also include a Wi-Fi radio 570 that allows it to communicate with the network via Wi-Fi, a biometric reader 580 to receive input from the client, and a user interface 590 of some sort to indicate the status of the band, battery, GPS receiver, and cellular connection. The wristband may also provide standalone clock functionality resembling that of a wristwatch.

Those skilled in the art will appreciate that although the standalone wristband 40c is designed to function on its own, it is sometimes helpful to pair it with a smartphone, tablet, or computer in order to conduct certain administrative tasks, such as updating the client profile, entering parameters stored in the wristband, etc., where a user interface having a keyboard, camera, etc., may be helpful. To facilitate this, the band 40c may include a Bluetooth radio 595, which would allow the band to be paired to a smartphone, tablet or other Bluetooth-compatible device.

Those skilled in the art will appreciate that the memory 540 may be used to store location, status, and other data when the wristband 40c is not connected to the monitoring system/backend 10 via the network 70. This may be due to poor cell phone service, a service outage, etc. In such a case, the data that would normal be reported to the monitoring system in real time will be stored in the memory 540 until such time as the band is connected to the network 70 and able to upload the data to the monitoring system/backend 10.

In another aspect, a standalone wristband 40c may be used in conjunction with smartphone (such as client device 40a described above in conjunction with FIG. 3) to provide redundancy and additional capabilities. A client may be required to carry a smartphone client device 40a and wear a standalone wristband 40c. In this case, it is not necessary for the two devices to be paired with each other via Bluetooth or other technology, as is the case in the client device discussed in conjunction with FIG. 4. Each of the smartphone 40a and wristband 40c may communicate GPS or cellular-based location data and other information independently with the monitoring center/backend 10. This provides redundancy because if either the smartphone 40a or wristband 40c fails for some reason (e.g., dead battery, damage, malfunction, etc.), the other device should continue to operate, thus providing data to the monitoring center/backend 10 and allowing communication between the monitoring center and the client.

This arrangement also allows the monitoring system to assess a measure of the client's compliance by using location data sent by each of the smartphone and wristband to independently determine the location of each device, and to further determine whether they are in close proximity to each other. If the system determines that they are in close proximity, this is a good indication that the client is complying with the compliance plan and that the devices are available to perform photo or video check-ins and other administrative or compliance-related functions. However, if the system determines that the devices are not in close proximity to each other, this may be an indication of non-compliance. Although a client's temporary separation from the smartphone may be a minor issue in some cases, it may also be an indication of attempts to circumvent or defeat the monitoring system. As such, a determination that the two devices are not in close proximity represents a metric or KPI that may be tracked and utilized to determine a client's compliance with a compliance program. Similarly, a record indicating that a client always keeps the smartphone in close proximity to the wristband may be viewed as a positive metric or KPI.

Figure 6:
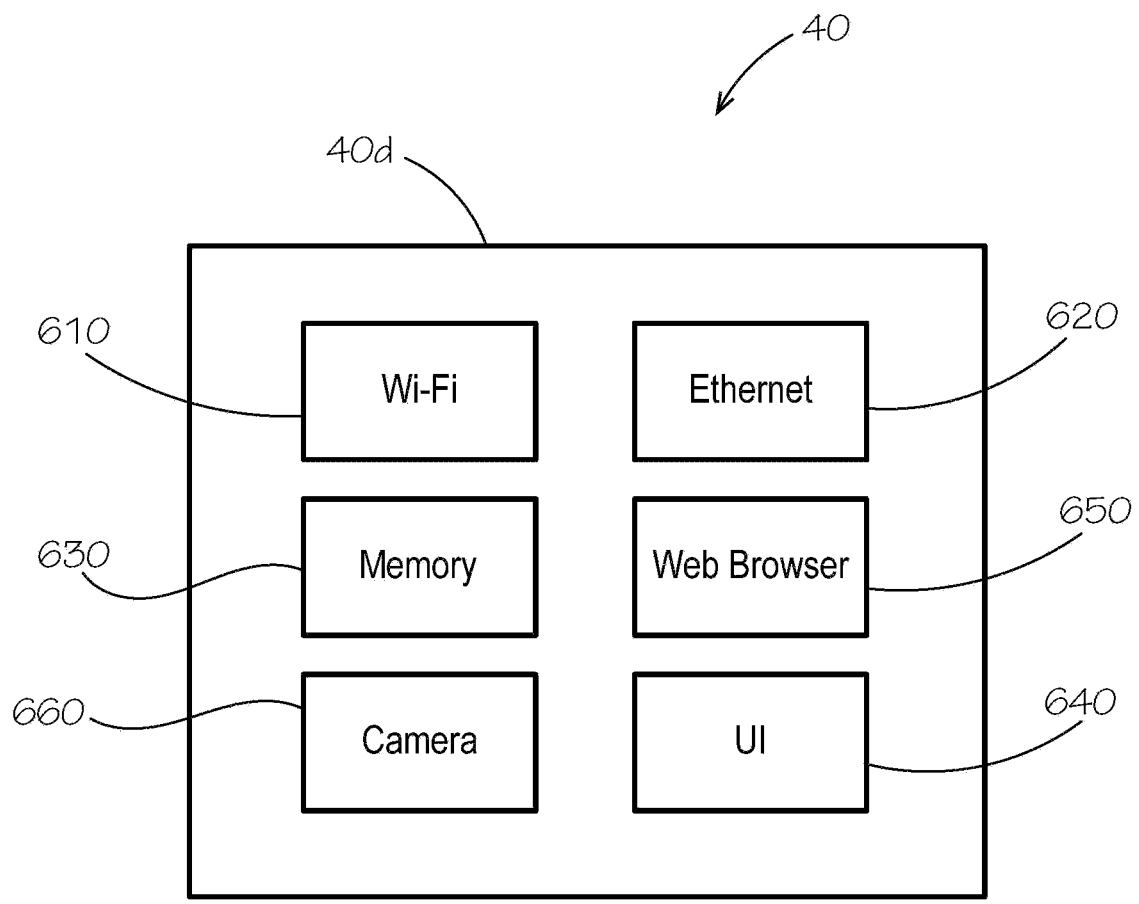
FIG. 6 is a block diagram of a client device that consists of personal computer, tablet, or similar device that provides a web browser for communicating with the electronic monitoring system.

In FIG. 6, the client device 40 is a personal computer 40d, tablet, or other device that is not usually carried around by the client. This type of client device may be used for clients that require "light" supervision. It includes Wi-Fi 610 or Ethernet 620 to connect with the remote network. It also includes memory 630, a user interface 640, such as display, mouse, trackpad, etc., and a web browser 650 for accessing websites associated with the electronic monitoring service. The personal computer may also include a camera 660 or other biometric sensor that allows the client to confirm his identity.

Those skilled in the art will appreciate that a similar device, i.e., a personal computer, tablet, etc., may be used by a supervisor to access information and perform supervisory functions. In this case, a supervisor may use a web browser to log in to his or her supervisory account, monitor clients, review or initiate check-ins, and perform other functions that may also be performed via smartphone-type client device 50. In many cases, it may be desirable to view information on the larger screen associated with a personal computer than on the smaller screen associated with a smartphone. In this sense, the computer and smartphone complement each other by allowing a supervisor to take advantage of a computer's features while in the office, and use a smartphone to keep up with clients while away from the office.

Figure 7:
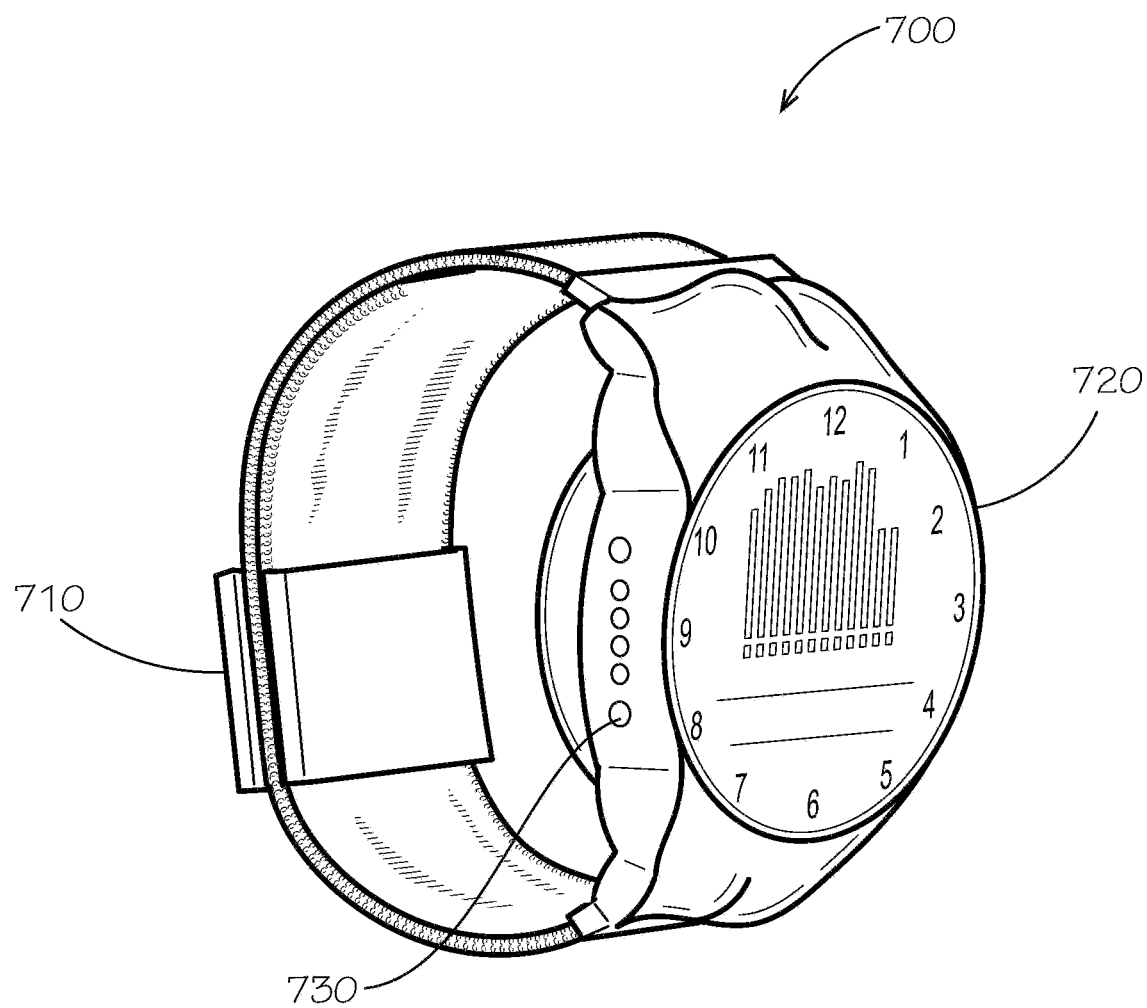
FIG. 7 is an illustration of a wristband that may be used as part of the client device of FIG. 4 or as the client device of FIG. 5.

FIG. 7 is an example of a band 700 or bracelet that may be worn by the client in order to track the client's location. The band shown in FIG. 7 may be a paired wristband 40b (shown in FIG. 4) or a standalone wristband 40c (shown in FIG. 5). The exterior features of the wristband 700 include a tamper-proof locking mechanism 710, a display 720 for providing some information to the wearer. The display 720 may be touch-sensitive and enable input from the client via a user interface. The wristband 700 also includes electrical contacts 730 that allow a battery charger (such as battery pack/charger 535 in FIG. 5) to be connected to the wristband. In some cases, the electrical contacts 730 may allow for data exchange between the wristband and a connected device such as a personal computer, smartphone, etc.

Figure 8:
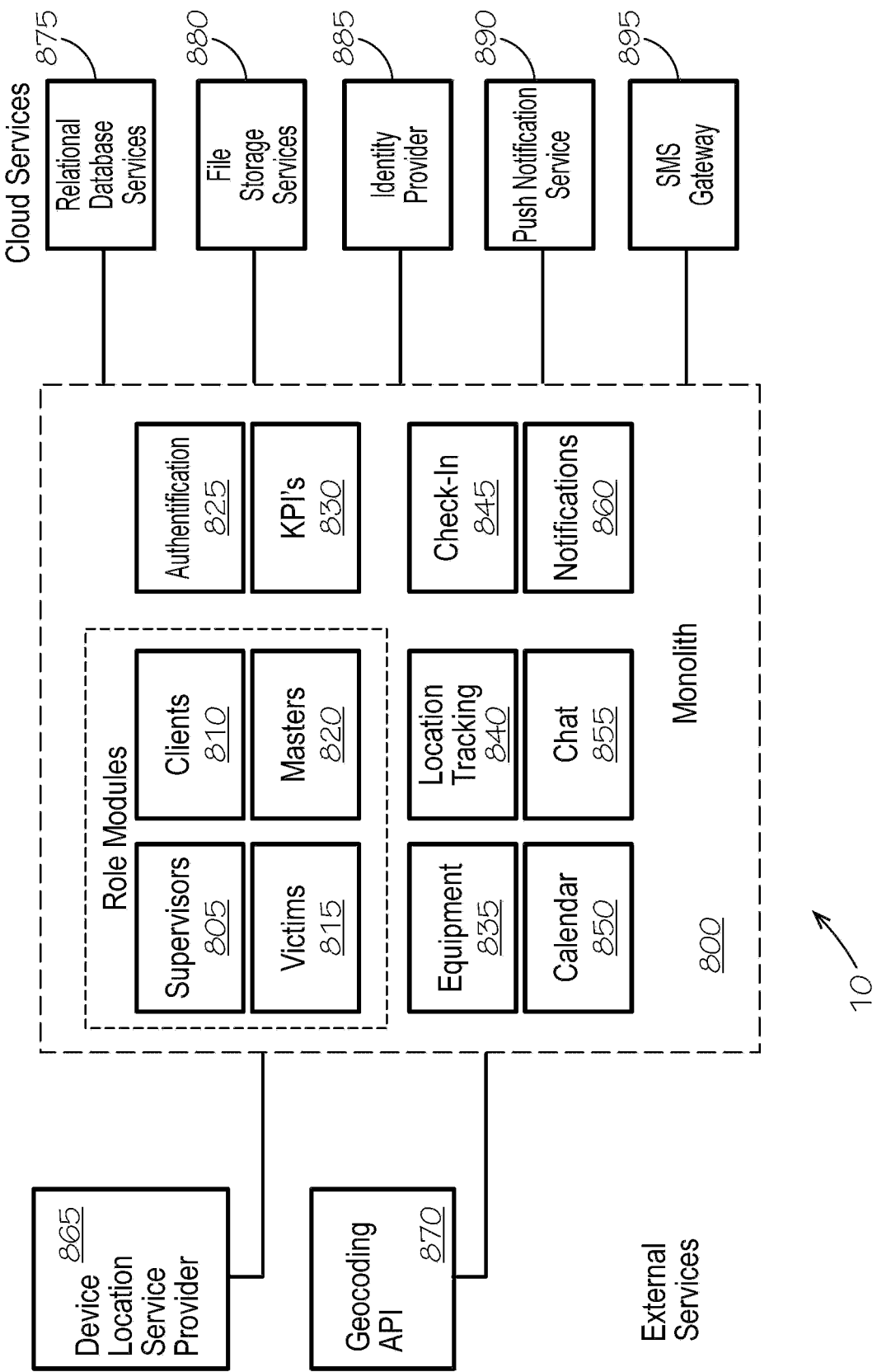
FIG. 8 is a block diagram of the monitoring center, or the backend of the monitoring system shown in FIG. 1.

FIG. 8 illustrates the primary functions and components of a monitoring center/backend 10 suitable for use with the monitoring system described herein. Generally, the functions and services shown in FIG. 8 fall into the categories of core software that executes the monitoring process and external services that may be provided by third parties.

The core software 800 includes a variety of modules associated with functions performed by the monitoring system. Four of the modules provide the functionality required to interface with people performing the different roles assigned to different users of the system. Supervisor module 805 manages the functionality offered to users who log in as supervisors on a supervisor device 50 or from a computer. Client module 810 manages the functionality offered to users who log in as clients on a client device 40. The masters module 820 provides high level management and administrative functions for use by the provider of the monitoring service. So, a master is responsible for the operation of the overall monitoring service, while a supervisor, in most cases, is responsible for using the monitoring service to track or monitor clients that have been assigned to him by the agency that employs him.

The monitoring system also provides functionality for users who log in as victims via a victims module 815. The victims module 815 allows victims to employ the monitoring system to enforce restraining or protection orders or other restrictions that are intended to keep a client away from a victim. Once a victim opts in, the monitoring system will track his or her location via the victim's smartphone. The victim's location is not stored, but is used to determine if the client is within a predetermined distance of the victim. If so, a warning or notification can be sent to the victim, the client, or the supervisor, depending on how the system is configured.

Authentication module 825 manages the processes associated with authenticating users when they attempt to log in to the monitoring system.

KPI module 830 is used to collect and evaluate or score metrics (KPIs) that are believed to be indicative, or in some cases, predictive, of a client's compliance with his compliance program. Additional information about KPIs and how they may be used is provided below.

Equipment module 835 is used to monitor inventories and assignment of client and supervisor devices.

Location tracking module 840 is used to receive and track the location data being provided by the various client devices. The module is responsible for comparing the client location data with geo-fencing data to ensure that the client is in permitted areas and avoiding prohibited areas. It also permits the real time display of the locations of monitored individuals for use by supervisors or masters.

Check-in module 845 manages the process of requiring clients to check-in in response to both scheduled and ad hoc check-in requests and which may be achieved via the app, by telephone or video call, among other modalities. Additional aspects of the check-in process are described below.

The calendar module 850, chat module 855, and notifications module 860 provide basic services used to operate the monitoring system. For example, the calendar module provides date-related information that is relevant to various aspects of the monitoring process. For example, the date is relevant to when a client is required to check-in, when he is expected to be in certain geographic areas, or when he has court hearings or other appointments. The chat module 855 enables a chat function with clients and supervisors who are logged into the app on their client devices 40 or supervisor devices 50. Notifications module 860 manages the notifications that are sent out to clients, supervisors and masters. These notification may be routine (e.g., reminders of upcoming check-ins, meetings, etc.), or warnings of violations or potential violations.

Some of the services employed by the monitoring system are provided by external service providers. Device location service provider 865 provides a real time data on the location of each device. In addition, Geocoding API 870, which may be provided by companies such as Google, allow a user of the system to define the geographic areas that are permitted or prohibited to various client. For example, this service may allow a supervisor to draw a circle around a client's work location on a map, and then the service will convert the circled region to data that is used by the location tracking module 840.

As mentioned above, the monitoring system may be deployed using cloud-based services for both storage and compute functions. FIG. 8 illustrates the use of relational databases 875, file storage services 880, and identity provider services 885, which may be hosted or provided by cloud services such as Amazon Web Services, Microsoft Azure, Apple, Google, etc. The identity provider services 885 is used to authenticate a user of the system, such as clients, supervisors, etc.

FIG. 8 also illustrates the use of two services to facilitate communication. A push notification service 890 is used to manage notifications that are pushed out to the apps on the various client devices. An SMS gateway 895 is used to put SMS messages (i.e., text messages) on the cellular phone network.

Figure 9:
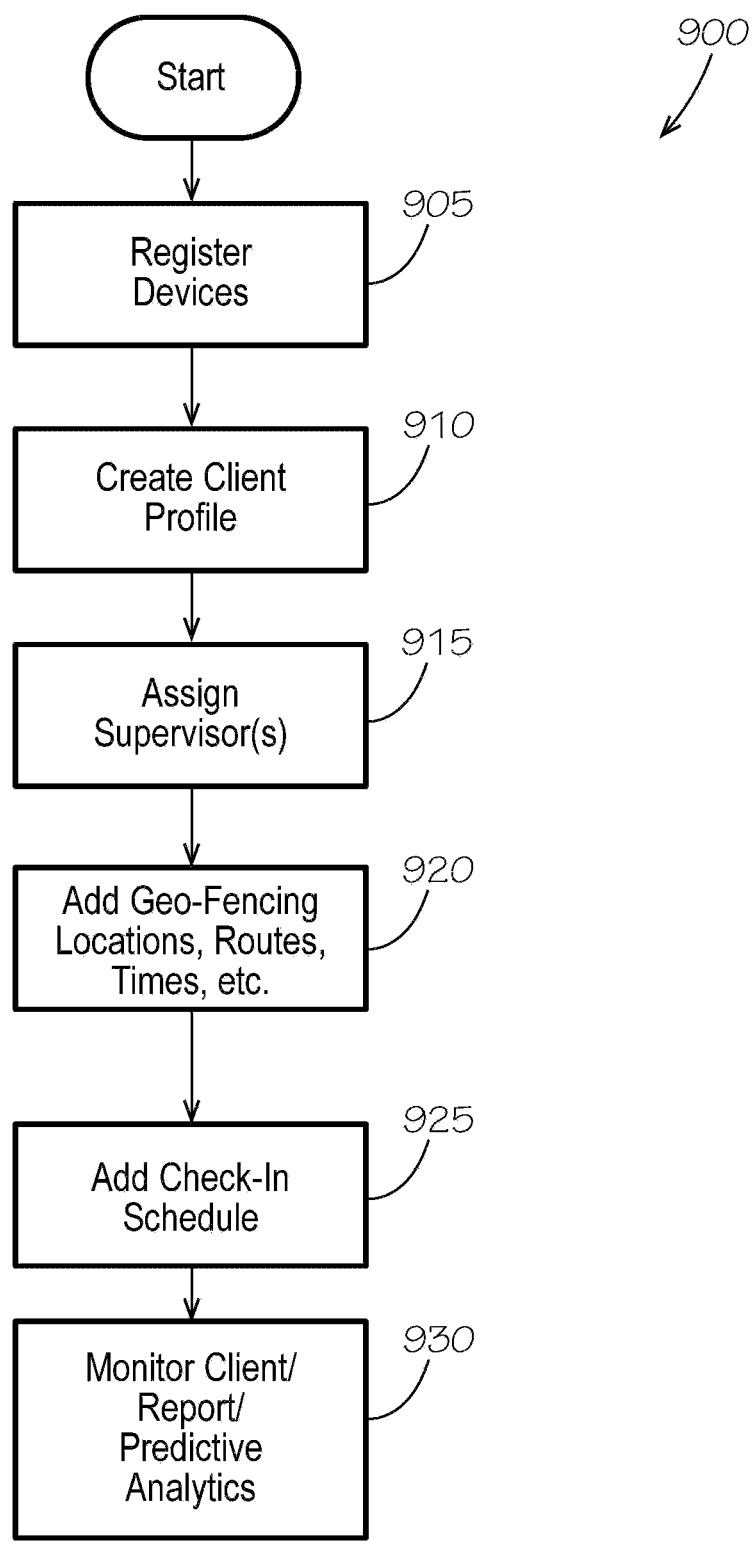
FIG. 9 is a flow chart that illustrates the method for establishing an initial compliance program for a client of the electronic monitoring system.

FIG. 9 illustrates a method 900 for establishing an initial compliance program for a new client. This function may be initiated by the client or a supervisor and, at step 905, allows the user to register the client device with the supervising authority. Each client will have a unique ID number, which may be issued by the government or the monitoring system provider, and their smartphone will be paired with a unique wearable monitoring device (if one is used). This process also allows the wearable monitoring device (if one is used) to be paired or associated with the smartphone via Bluetooth or other wireless technology. If the smartphone includes biometric sensors, such as fingerprint reader or iris scanner, the client will also be required to scan his or her fingerprint or iris and have them associated with the smartphone and with his account with the supervising authority. The smartphone's camera may be used to capture a photo of the client in order to enable facial recognition by the client device or the monitoring system. Similarly, the monitoring system may use the smartphone's microphone to record the client's voice, which may be used in conjunction with voice recognition algorithms to verify a client's identity during voice check-ins, phone calls, conference calls, judicial conferences, and the like. Note that if the paired device becomes unpaired for some reason, the smartphone may send a notification to the supervising authorities and immediately initiate the biometric check-in process as a backup.

A client profile is created at step 910. This may be accomplished using data provided by the client or by the agency that referred the client to the monitoring system. The client profile may include name, residence address, work address, work schedule, phone numbers, email address, reason for being monitored, etc. This also includes matching a band (if a band is used) to the client's profile. A supervisor is assigned at step 915. Geo-fencing locations, routes, and schedules are added at step 920. An initial check-in schedule is established at step 925.

The information in the client profile is used in conjunction with account-related functions. They confirm that the account is active. They also provide account number, the user's name, the authorizing or supervising authority, the name of the judge or other official who authorized the order, and any other information that might be deemed relevant by the supervising authority.

Figure 10:
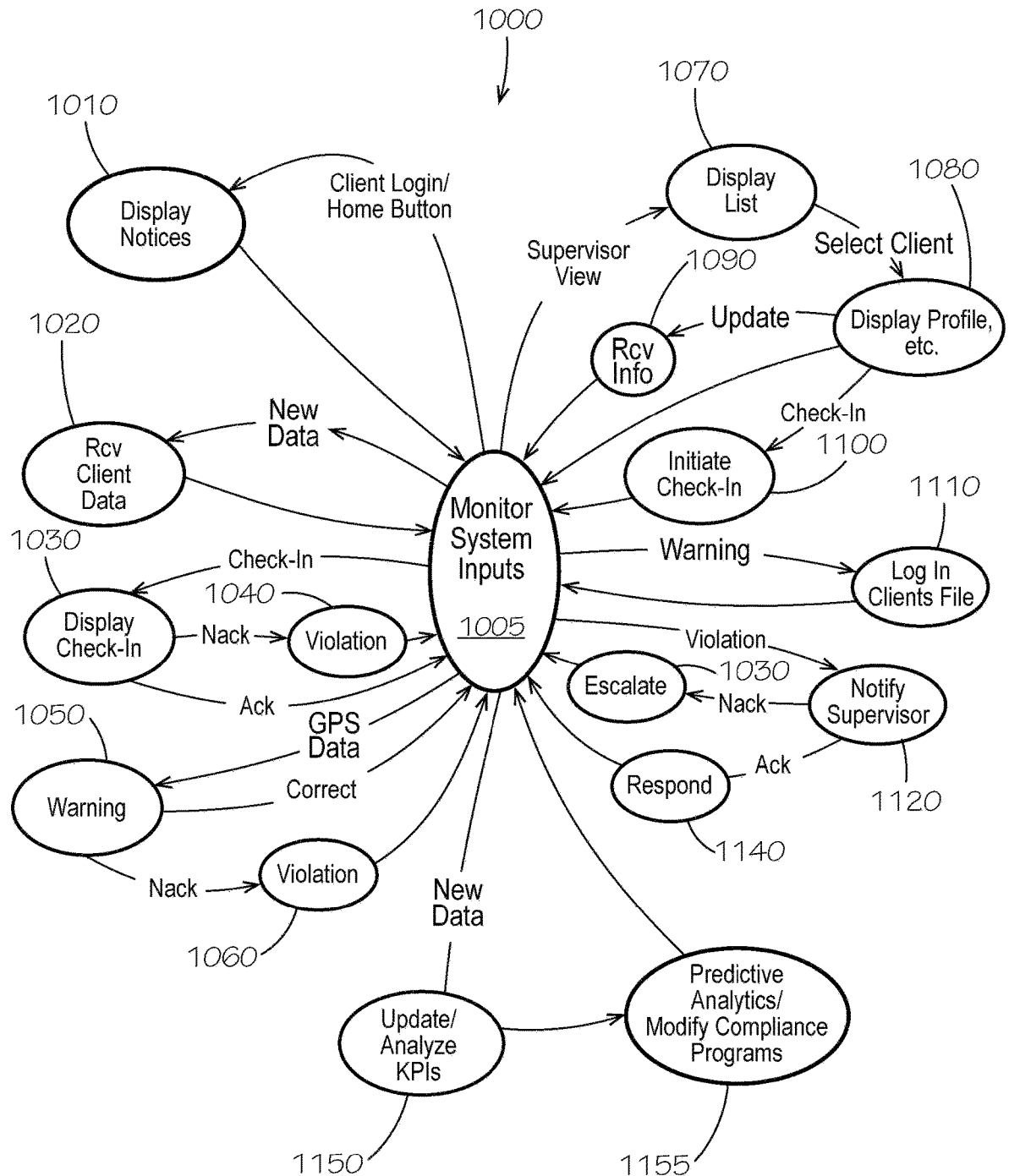
FIG. 10 is a state diagram that illustrates the processes carried out by the electronic monitoring system.

At step 930, the initial compliance program is set up and the system is ready to monitor the client, as described more completely in conjunction with FIG. 10. In addition, the monitoring system will carry out reporting functions and perform predictive analytics on the metrics, KPIs, and other data that are collected by the monitoring system as part of the ongoing process of monitoring clients and interacting with clients, supervisors, and other users of the monitoring system.

Generally described, after a compliance program has been established, the monitoring system described herein can be used to track a client's location and verify a client's compliance using check-ins. Once the client device is associated with the client, the system is ready to be used to monitor the client's movement. This may be accomplished using the GPS capabilities and other location services (e.g., proximity to cell phone towers or Wi-Fi access points) that are part of the smartphone and/or wearable monitoring band or other device and commonly used with smartphone apps such as navigation and mapping apps. So, if the client device knows its location and that the client is in close proximity to it (as a result of the wireless link between the smartphone and the paired wearable device or via triangulation from GPS location data received by the smartphone and wearable device), the location of the offender may be assumed to be known under normal circumstances.

The term "geofencing" is used to describe the process of setting up electronic boundaries that are used in conjunction with GPS data (or other location services) to keep a person within or outside of a certain area. Though many clients may be confined to home, some clients are permitted to leave home to go to work, counseling, etc. on a regular basis. These permitted locations and travel routes may be programmed into the system so that it knows where the client is allowed to be and if he or she has departed from those areas. Those who are under house arrest must occasionally leave home to seek medical attention or for other reasons. With this system, the supervising authorities can make changes to the geofencing parameters applicable for that client and permit the client to visit those places on a temporary basis. Similarly, the geofencing parameters enforced on a weekday may be different than those enforced on the weekends. One advantage of using app-based geofencing is that the geofencing parameters can vary by time of day, day of week, etc. Similarly, they can be changed or updated quickly and easily as circumstances may require. Geofencing also permits notifications to third parties on an opt-in basis.

The client device 40 may communicate a variety of information to the supervising authorities and the monitoring system via the cellular system, Wi-Fi, or other communications technologies available to the device. For example, the app may be programmed with the permitted locations and routes and monitor those internally. In this case, it would notify the supervising authorities if there is a deviation or departure from those locations and routes. Alternatively, the device may send its location to the supervising authorities, whose central monitoring system may track the location and ensure that the client is where he or she belongs. The system may rely on a combination of these two approaches, such that the client monitoring device (1) constantly monitors the client's location and alerts the supervising authorities to any departure, and (2) periodically sends location information or some other signal to the supervising authorities for their consideration or use. For example, the client may be given relative freedom during the workday, but the supervising authorities may want to confirm that he or she is at home during the night. As referenced above, the communication between the device and the supervising authorities is not one-way. The supervising authorities may send information to the device, including changes in the geofencing parameters. They may also initiate check-in requests on an ad hoc basis or on a predetermined schedule.

In some cases, a victim of a crime may want to know if the client comes into close proximity with the victim or the victim's home, workplace, etc. If the victim opts in, the victim's home, workplace, etc. may be included in the geofencing parameters. Then, if the monitoring system determines that the client is within a predetermined distance of those locations, it will send a signal to the supervising authorities or, in some cases, to the victims themselves. Similarly, the victim may allow their location to be tracked in real time so that the system will alert the client, supervisor, or victim if the client comes within a predetermined distance of the victim.

The client device 40 may include one or more biometric sensors, such as a camera, fingerprint reader and an iris scanner. This can be used in several ways. Once the client's photo or unique biometric features are recorded, the biometric sensors on the client device can be used in conjunction with a photo check-in or biometric check-in to confirm that the client is with the smartphone or wearable device (as the case may be). For example, depending on the severity of the client's offense, the supervising authorities may frequently require the client to respond to a check-in request by scanning his fingerprint or iris. This would provide a high level of confidence that the client is with the smartphone and/or has not tampered with or removed the monitoring device.

This biometric check-in feature can also be used to mitigate and reconcile false alarms. For example, if the supervising authorities receive a signal indicating that the smartphone has failed or the monitoring device (e.g., wristband or ankle bracelet) has been disabled, they can instruct the client device to require immediate biometric check-in. If the client responds appropriately, this may avoid the need to send law enforcement officers out to investigate or apprehend the client. The use of biometric check-in and other methods of avoiding false alarms is very advantageous because it conserves precious law enforcement resources. This is especially true in a large, sparsely-populated jurisdiction where dispatching an officer to the other side of the county may require him to travel many miles and may take a considerable amount of time that would be better spent on more productive tasks. Depending on the malfunction and other considerations, it may be possible for the supervising authorities to send a replacement device to the client and to ensure that it is properly attached to the client and configured without requiring a face-to-face meeting with the client.

Turning now to FIG. 10, a method 1000 for optimizing a client's compliance program will be described. FIG. 10 is a state diagram that illustrates operations that are performed by the monitoring system in response to various inputs, including inputs from the devices described above. A state diagram is used instead of a flow chart because, for the most part, the high-level description of the method 1000 is not made up of a large number of steps that are executed sequentially. Instead, the method monitors inputs from a variety of sources and performs functions in response to those inputs.

For purposes of this description, the method 1000 begins at state 1005, where the monitoring system is monitoring a variety of inputs from client devices, supervisor devices, and other sources.

In response to a client logging in on a client device, or a client pressing a "home" button or similar function on a client device, the method proceeds to state 1010 and displays a home screen, which may include a variety of notices. For example, the home screen may indicate events, such as check-ins, that are scheduled for that day. This ensures that the client is aware of upcoming events that are part of the compliance program. The client device may also display a list of violations that have been recorded. For example, the device may display the number of curfew violations, such as the number of work curfew violations and the number of home curfew violations. The display may include the number of equipment-related violations, such as the number of wristband tamper violations, phone low battery violations, or wristband low battery violations. The display may include check-in violations, including the number of photo, phone, or in-person check-ins that have been requested, completed, or accepted by the supervisor. Those skilled in the art will appreciate that the display may be used to provide information that assists the client in his or her efforts to comply with the compliance program. The information acts as a score sheet of sorts that may encourage compliance and good behavior, or provide conspicuous warnings about non-compliance and bad behavior. After the notices are displayed, the method returns to state 1005.

If the client chooses to enter new data into his profile, the method proceeds to state 1020, where it receives the client's data and stores it in the client's profile. This data may include updates to any of the data entered when the client's profile was set up. It may also include new information regarding home, employment, phone numbers, addresses, work schedules, etc. After the data is entered, the method returns to state 1005.

In response to a determination that a client needs to check-in, the system goes to state 1030. The monitoring system may determine that a client needs to check-in based on a variety of factors. For example, the check-in may be scheduled to occur at a certain time. It may have been initiated by the client's supervisor. It may have resulted from an assessment of KPIs and other data based on the client's track record, current location, recent movement, etc. In the case of clients who are using the smartphone only client device 40a, it is useful to generate random photo check-in requests to ensure that the client is still with the smartphone. At state 1030, the check-in request is displayed on the client device. If the client acknowledges the request and checks in as required (indicated as "Ack" on FIG. 10), the system returns to state 1005. If not (indicated as "Nack" on FIG. 10), the method may go to step 1040 and indicate a violation before returning to state 1005. Note that the process of checking in may vary and may include simply responding to a prompt, confirming location using GPS coordinates via the client device, entering biometric data such as a fingerprint, initiating a voice of video call to the supervisor or to a monitoring station/call center or taking and transmitting a photograph. In some systems, the client's check-in response may be displayed to the supervisor, who will review the client's response and then accept the check-in if it is in compliance with the client's requirements, or reject it if it is deficient in some manner.

In response to location data showing that the client is in the wrong place (i.e., has entered a restricted area or left an area to which he is confined), the method goes to state 1050 and generates a warning on the client device. If the client corrects the situation within a predetermined period of time, the system returns to state 1005. If not, the method goes to state 1060 and indicates a violation before returning to state 1005.

Another reason GPS data may trigger on the client's location is that the client's current location may be too close to the location of another person, such as a victim. In this scenario, the location of the other person may correspond to the person's home, office, or other fixed location. Alternatively, the other person may consent to being tracked in real time for the purpose of ensuring that a client does not get within a predetermined distance of that person's actual, real-time location. If the client gets too close, the system can respond by providing a warning to the client at state 1050 so that the client may correct the problem. In addition, the monitoring system may notify the other person, or the client's supervisor, of the client's proximity to the other person.

In response to a supervisor logging in or viewing a client list, the method goes to state 1070 and displays a list of clients on the supervisor device. The clients may be listed in a variety of ways, including alphabetically or in groups or by locations indicated on a map. Groups may indicate the nature of the clients' offenses, if appropriate. For example, a supervisor's clients may be characterized as violent offenders, sex offenders, or non-violent offenders. At that point, the supervisor may select a client directly or by drilling down into a group. The method goes to state 1080 and displays information such as the selected client's profile, photo, current location, contact information, recent locations or path of travel, etc. The client's location and path of travel may be displayed using mapping features on the app that runs on the supervisor's device. If the supervisor determines that no further action is required, the method returns to state 1005. If the supervisor wants to update any information associated with the client, the method goes to state 1090 and receives and stores that information before returning to state 1005. If the supervisor decides to initiate a check-in for some reason, the method goes to step 1100 and initiates the check-in before returning to state 1005. The check-in request would then be presented to the client as discussed above in conjunction with state 1030.

In response to a warning being initiated at state 1050 (discussed above), the method proceeds to state 1110 and logs this event in the client's profile. The method then returns to state 1005.

In response to a violation being triggered, the method proceeds to state 1120 where it logs the violation and notifies the supervisor. Violations may be of the type described above in conjunction with states 1040 or 1060 (both discussed above). Violations may also arise from other events. For example, violations may be location-related, such as when location data indicates that the client is not where he is supposed to be (e.g., a home curfew violation or work curfew violation), or is where he is not supposed to be (e.g., a restricted zone violation, such as a school), or is near a victim who has opted into the monitoring system. Violations may be equipment-related. For example, a band tamper violation occurs when the client tampers with the wristband. A phone battery violation or band battery violation occurs if the batteries in the client device are not charged at an acceptable level. Check-in-related violations may occur when a client misses, or fails to respond properly, to a check-in request. These violations may include photo check-in violations (where the client doesn't respond to a photo check-in request using the camera on the client device), call violations (where the client fails to keep an appointment for a phone call with his supervisor), or live appointment violations (where the client misses an appointment for an in-person meeting with his counselor).

If, for some reason, the supervisor does not respond within a predetermined period of time, the method goes to state 1130 and escalates the violation to others in the supervisor's office or to the master in order to ensure that the violation is addressed promptly. Once the violation is escalated, the method returns to state 1005. If the supervisor does respond, the method goes from state 1120 to state 1140 and receives the supervisor's response. At this point, the supervisor may evaluate the situation and decided that no further action is required, or that the client needs to check-in. The supervisor's evaluation may include viewing the client's current location, or recent path of travel, or other data available through the monitoring system. It is also possible that if the client is a parolee or considered dangerous for some reason, the supervisor may respond by sending authorities to check on the client in person or to detain the client. The method then returns to state 1005.

In response to new client-related information or data, the method goes to state 1150, where it records the information and updates and analyzes its KPIs or metrics regarding that client. The KPIs can be used to determine a compliance score, or objective measure of the risk associated with a client. This compliance score, or risk assessment, may be determined using artificial intelligence based on a variety of factors, such as the client's past compliance or performance, the reason the client is being monitored, current location, recent movement, recent notes entered by supervisor, etc. At state 1155, the method may, after taking into account KPIs and other metrics associated with the client and with other clients tracked by the monitoring system, perform predictive analytics on the KPIs and other data determine that the client's compliance program needs to be modified, as discussed in more detail below. After it is modified, the method then returns to state 1005.

Those skilled in the art will appreciate that the KPIs or metrics associated with a single client are helpful in determining an individual's compliance score and modifying his or her compliance program as needed. However, the KPIs and metrics are much more useful when they are combined with data associated with many other clients. The monitoring system can aggregate and analyze KPI data from many clients to recognize behavioral patterns and create models or predictive analytics that may be used across the system and with a number of clients to lower the rate of non-compliance or recidivism. In this scenario, negative patterns or trends can be identified and adjustments made in order to improve compliance by clients across the system and reduce the burden on both clients and supervisors.

As mentioned above, the monitoring system is flexible in terms of the KPIs or metrics that may be considered and how the compliance program may be modified to improve compliance in response to those metrics. In one example, the monitoring system may take into account various categories of violations, such as equipment-related violations, location-related violations, and check-in-related violations (discussed above). The specific metrics considered will depend on the reason the client is being monitored, the capabilities of the monitoring system, and the desires of the organization that operates the monitoring system.

Compliance programs include a number of elements or features that can be changed in response to KPIs that are collected and analyzed. For example, check-in frequency can be increased if the client's compliance is lacking. Alternatively, check-in frequency can be decreased if the client's compliance is exceptional, thus decreasing the burden on client and supervisor alike. The mix of check-ins can be shifted toward more phone or in-person check-ins in order to allow the supervisor to make contact with the client and impress upon him the need to comply with the program. In some cases, the compliance program may be altered by replacing one supervisor with another if, for example, it appears that personality conflicts or other incompatibilities are interfering with compliance. In some cases, for example, data may suggested that a client will respond better to a younger supervisor, an older supervisor, a male supervisor, or a female supervisor. These, and many other changes, are possible and desirable because the goal is not to be heavy handed or to impose burdensome, but ineffective, requirements on the clients. Instead, the goal is to ensure compliance while imposing the lowest burden on the clients and supervisors.

In another aspect, the present electronic monitoring system with KPI-based optimization provides a solution that replaces previous ankle monitors with more advanced technology and at a lower cost. The system utilizes existing mobile phone and wearable device-based technologies. This allows GPS tracking and geofencing for the client and for the benefit of victims who may opt-in to the system. Thus, the system may monitor the client's location relative to a fixed location associated with the victim (e.g., the victim's home or work location) and provide a notification or warning to the client, supervising authority, or victim if the client gets too close. Alternatively, it is possible to also track the location of the victim and provide a notification or warning to the client, supervising authority, or victim if the client gets too close to the victim's current location.

The check-in management function may be adjusted in terms of timing, frequency, and randomness. This allows flexibility depending on the nature of the client's offense, his or her compliance history, etc.

The system allows a variety of notifications. In addition to those described above, the smartphone app may notify the supervising authority that the client is connected and that the system is up and running. The system may also operate so as to notify the client that he or she needs to check-in. The nature of the check-in may also be varied. It may require a simple response on the client device, or may require the uploading of photos, map images, or biometric data or a live voice or video call to the supervisor. This allows the system to avoid going directly from a normal (or green) status to red if the client is believed to be noncompliant. With these tools, the system can go to a yellow status and require check-in and other confirmation. If the client checks in, the status can return to green. If not, it can be escalated to red and conventional enforcement actions may be initiated. In other words, the system allows the supervising authority to monitor and escalate alerts according to pre-existing matrices for various forms of supervised release. The type of dynamic reporting made possible by this system allows supervising authorities to ensure that they can effectively oversee thousands of clients via the green/yellow/red process described herein.

During routine operation, the client device(s) serve(s) as the GPS/location tracker. The geofencing function is based on the client device's location and may be monitored by the client device and by the supervising authority's remote system. If the monitoring device loses contact with the client device (e.g., out of range, batteries empty, etc.), several corrective actions may be taken. The client device can require a biometric check-in. The client device may notify the supervising authority, which may require a biometric check-in. Other actions are also possible based on the supervising authority's policies and experience with the client.

As will be appreciated by those skilled in the art, the system described herein takes advantage of the check-in options and KPI tracking and analysis to provide flexibility to the supervising authority. When an apparent infraction occurs, the system may be set up to handle it locally where the client device requires check-in and resolves the issue if the check-in occurs. Alternatively, the client device can notify the supervising authority, which may then (either manually or automatically) require check-in and, if check-in does not occur, escalate the alert to law enforcement, bail bondsmen, or court personnel depending on local jurisdictional requirements and other considerations.

Although several aspects have been disclosed in the foregoing specification, it is understood by those skilled in the art that many modifications and other aspects will come to mind to which this disclosure pertains, having the benefit of the teaching presented in the foregoing description and associated drawings. It is thus understood that the disclosure is not limited to the specific aspects disclosed hereinabove, and that many modifications and other aspects are intended to be included within the scope of any claims that can recite the disclosed subject matter.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, can be executed out of order from that shown or discussed, including substantially concurrently or in reverse order, depending on the functionality involved, as would be understood by those reasonably skilled in the art of the present disclosure. Many variations and modifications can be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A method for optimizing compliance of a tracked person by way of a mobile device, the method comprising the steps of:

receiving, at a monitoring computer communicatively coupled to a mobile client device associated with the tracked person and to a supervisor computer device associated with a supervisor assigned to the tracked person, profile information associated with a tracked person, the profile information identifying the tracked person and indicating a reason the tracked person is being monitored, the monitoring computer communicatively coupled to the mobile client device and the supervisor computer device by way of a telecommunications network, the mobile client device configured to be carried or worn by the tracked person, the mobile client device comprising a Global Positioning System (GPS) system configured to determine a location of the mobile client device and the mobile client device configured to transmit, to the monitoring computer, by way of the telecommunications network transmitted information including location-related information related to the location of the client device determined by way of the location system, equipment-related information related to the condition of the mobile client device, and check-in related information provided by the tracked person;

the tracked person being associated with a compliance program, the compliance program stored on a database of the monitoring computing system and comprising location-related events, equipment-related events, and check-in-related events, the location-related events including geo-fencing parameters based on the profile information, and the check-in-related events including a plurality of scheduled check-in events and a plurality of ad hoc check-in events;

calculating, by the monitoring computer, an acceptable compliance score based on the profile information and the location-related events, equipment-related events, and check-in-related events associated with the compliance program;

notifying the tracked person, by the monitoring computer via the mobile client device, of check-in related events, the check-in related events comprising the plurality of scheduled check-in events;

receiving, from the mobile client device by the monitoring computer via the telecommunications network, location-related information related to the location of the mobile client device;

determining, by the monitoring computer, that the location-related information indicates a location-related violation of the geo-fencing parameters of the compliance program;

transmitting, from the monitoring computer to the mobile client device via the telecommunications network in response to the monitoring computer determining that the location-related information indicates the location-related violation, a warning regarding the location-related violation for presentation to the tracked person by way of the mobile client device;

receiving, by the monitoring computer from the mobile client device via the telecommunications network, additional location-related information;

determining, by the monitoring computer, that the additional location-related information indicates that the location-related violation has not been corrected within a predetermined period of time;

recording, by the monitoring computer in response to the monitoring computer determining that the location-related violation has not been corrected within the predetermined period of time, the location-related violation in violation data associated with the tracked person;

receiving, by the monitoring computer via the telecommunications network, equipment-related information from the mobile client device;

determining, by the monitoring computer, that the equipment-related information indicates an equipment-related violation;

recording, by the monitoring: computer in response to determining that the equipment-related information indicates an equipment-related violation, the equipment-related violation in the violation data associated with the tracked person;

determining, by the monitoring computer, that the tracked person has missed a check-in-related event;

recording, by the monitoring center in response to determining that the tracked person has missed the check-in-related event, a check-in-related violation in the violation data associated with the tracked person;

reporting, by the monitoring computer to the supervisor device via the telecommunications network, the location-related violation, the equipment-related violation, or the check-in-related violation to the supervisor device;

aggregating, by the monitoring computer, the violation data associated with the tracked person with additional violation data associated with a plurality of additional tracked persons to generate aggregated violation data;

determining, by the monitoring computer, behavioral patterns indicated by the aggregated violation data;

determining by the monitoring computer based on the behavioral patterns determined, a behavior model;

revising, by the monitoring computer based on the behavior model and in response to determining that a number of the recorded location-related violations, equipment-related violations, and check-in-related violations associated with the tracked person exceeds a first predetermined number, the compliance program to generate a revised compliance program that includes additional scheduled check-in events and ad hoc check-in events required of the tracked person; or revising, by the monitoring computer based on the behavior model and in response to determining that a number of the recorded location-related violations, equipment-related violations, and check-in-related violations associated with the tracked person is less than a second predetermined number, the compliance program to generate a revised compliance program that includes fewer scheduled check-in events and ad hoc check-in events required of the tracked person; and presenting, by way of the mobile client device and in accordance with the revised compliance program, check-in related events for the tracked person.

2. The method of claim 1, wherein the mobile client device comprises a smartphone.

3. The method of claim 2, wherein the mobile client device further comprises a wearable device paired with the smartphone.

4. The method of claim 1, wherein the mobile client device comprises a wearable device having GPS and cellular capabilities.

5. The method of claim 1, wherein the geo-fencing parameters comprise geo-fencing zones indicating at least one of a permitted zone or a restricted zone and determining whether the location-related information indicates a location-related violation comprises comparing the location-related information to the geo-fencing zones.

6. The method of claim 1, wherein the equipment-related information comprises at least one of band status, band battery level, or phone battery level, and an equipment-related violation comprises at least one of a band tamper violation, a band battery violation, or a phone battery violation.

7. The method of claim 1, wherein the check-in-related events comprise at least one of a photo check-in, a video check-in, a voice check-in, or a biometric check-in and a check-in-related violation comprises failure to respond to a check-in request displayed on the mobile client device.

8. The method of claim 1, further comprising the step of receiving victim location-related information indicative of a location of a victim and wherein a location-related violation comprises a determination that the location of the tracked person is within a predetermined distance of the location of the victim.

9. A system for monitoring a tracked person by way of a mobile device, the system comprising:

a monitoring computer communicatively coupled, by way of a telecommunications network, to a mobile client device associated with the tracked person and to a supervisor computer device associated with a supervisor assigned to the tracked person, the mobile client device being associated with a tracked person and having a Global Positioning System (GPS) system configured to determine a location of the mobile client device and the mobile client device configured to transmit, to the monitoring computer, by way of the using a telecommunications network transmitted information including location-related information regarding the location of the client device determined by way of the location system, equipment-related information regarding the condition of the mobile client device, and check-in-related information provided by the tracked person, and the supervisor device being associated with a supervisor assigned to the tracked person, wherein the monitoring computer is configured to:
receive profile information associated with the tracked person, the profile information identifying the tracked person and indicating a reason the tracked person is being monitored;

storing a compliance program for the tracked person, the compliance program comprising location-related events, equipment-related events, and check-in-related events, the location-related events including geo-fencing parameters based on the profile information, and the check-in-related events including a plurality of scheduled check-in events and a plurality of ad hoc check-in events;

notify the tracked person, via the mobile client device of check-in related events the check-in related events comprising the plurality of scheduled check-in-related events;

receive, from the mobile client device by way of the telecommunications network, location-related information related to the location of the mobile client device;

determine whether the location-related information indicates a location-related violation of the geo-fencing parameters of the compliance program;

transmit, to the mobile client device by way of the telecommunications network, in response to determining that the location-related information indicates the location-related violation, a warning regarding the location-related violation for presentation to the tracked person by way of the mobile client device;

receive, from the mobile client device, additional location-related information;

determine whether the additional location-related information indicates the location-related violation has been corrected within a predetermined period of time;

record, in response to the location tracking module determining that the location-related violation has not been corrected within the predetermined period of time, the location-related violation in violation data associated with the tracker person;

receive, from the mobile client device by way of the telecommunications network, equipment-related information;

determine whether the equipment-related information indicates an equipment-related violation;

record, in response to determining that the equipment-related information indicates an equipment-related violation, the equipment-related violation in the violation data associated with the tracked person;

determine whether the tracked person has missed a check-in-related;

record, the check in related violation in response to determining that the tracked person has missed the check-in-related event, caused a check-in-related violation in the violation data associated with the tracked person;

report a recorded location-related violation, an equipment-related violation, or a check-in-related violation to the supervisor device by way of the telecommunications network;

aggregate the violation data associated with the tracked person with additional violation data associated with a plurality of additional tracked persons to generate aggregated violation data;

determine behavioral patterns indicated by the aggregated violation data;

determine, based on the behavioral patterns determined, a behavior model;

revise, based on the behavior model and in response to determining that a number of the recorded location-related violations, equipment-related violations, and check-in-related violations associated with the tracked person exceed a first predetermined number, the compliance program to generate a revised compliance program that includes additional scheduled check-in events and ad hoc check-in events; and revise, based on the behavior model and in response to determining that a number of the recorded location-related violations, equipment-related violations, and check-in-related violations associated with the tracked person are less than a second predetermined number, the compliance program to generate a revised compliance program that includes fewer scheduled check-in events and ad hoc check-in events; and notify, by way of the mobile client device, the tracked person of check-in related events in accordance with the revised compliance program.

10. The system of claim 9, wherein the mobile client device comprises a smartphone.

11. The system of claim 10, wherein the mobile client device further comprises a wearable device paired with the smartphone.

12. The system of claim 9, wherein the mobile client device comprises a wearable device having OPS and cellular capabilities.

13. The system of claim 9, wherein the geo-fencing parameters comprise geo-fencing zones indicating at least one of a permitted zone or a restricted zone and determining whether the location-related information indicates a location-related violation comprises comparing the location-related information to the geo-fencing zones.

14. The system of claim 9, wherein the equipment-related information comprises at least one of band status, band battery level, or phone battery level, and an equipment-related violation comprises at least one of a band tamper violation, a band battery violation, or a phone battery violation.

15. The system of claim 9, wherein the check-in-related events comprise at least one of a photo check-in, a video check-in, a voice check-in, and a biometric check-in and a check-in-related violation comprises failure to respond to a check-in request displayed on the mobile client device.

16. The system of claim 9, wherein the monitoring center's computer resources are further configured to receive victim location-related information indicative of the location of a victim and wherein a location-related violation further comprises a determination that the location of the tracked person is within a predetermined distance of the location of the victim.

17. A system for monitoring a tracked person, the system comprising:
a monitoring computer storing a compliance program for a tracked person; and
a mobile client device associated with the tracked person,
the monitoring computer communicatively coupled, by way of a communications network, to the mobile client device and a supervisor device associated with a supervisor of the tracked person;
the compliance program specifying scheduled check-in events for the tracked person,
the mobile client device configured to present, in accordance with the compliance program, requests for check-in by tracked person;
the mobile client device comprising:

a positioning system configured to sense a location of the mobile client device;
a location module configured to determine, based on a location of the mobile client device sensed by the positioning system, location information that is indicative of a location of the mobile client device;
an equipment module configured to determine equipment information indicative of a condition of the mobile client device; and
a check-in module configured to, determine check-in information indicative of check-in events performed using the mobile client device,
the mobile client device configured to send, to the monitoring computer by way of the communications network, the location information, the equipment information and the check-in information,
the monitoring computer configured to:
determine, based on the location information from the mobile client device and location violation parameters defined by the compliance program, whether a location-related violation has occurred and whether the location-related violation has been corrected in a predetermined amount of time;
send, to the mobile client device in response to determining that a location-related violation has occurred, warning information for the location-related violation, wherein the mobile client device is configured to present, in response to receiving the warning information, a warning for the location-related violation;
record, in response to determining that the location-related violation has not been corrected in a predetermined amount of time, a record of the location-related violation in violation data associated with the tracker person;
determine, based on the equipment information received from the mobile client device and equipment violation parameters defined by the compliance program, whether an equipment-related violation has occurred;
record, in response to determining that an equipment-related violation has occurred, a record of the location-related violation in the violation data associated with the tracker person;
determine, based on the check-in information received from the mobile client device and check-in violation parameters defined by the compliance program, whether a check-in-related violation has occurred;
record, in response to determining that a check-in-related violation has occurred, a record of the check-in-related violation in the violation data associated with the tracker person;
report the location-related violation, the equipment-related violation, or the check-in-related violation to the supervisor device for presentation to the supervisor of the tracked person;
aggregate the violation data associated with the tracked person with additional violation data associated with a plurality of other tracked persons to generate aggregated violation data;
determine, based on the aggregated violation data, behavioral patterns;
determine, based on the behavioral patterns determined, a behavior model;
determine whether a number of the location-related violations, equipment-related violations, and checkin-related violations recorded in the violation data associated with the tracked person satisfies a threshold;

revise, based on the behavior model and in response to determining that the number of the recorded location-related violations, equipment-related violations, and check-in-related violations associated with the tracked person satisfies the threshold, the compliance program to generate a revised compliance program that includes a modified schedule of check-in events; and notify, by way of the mobile client device, the tracked person of check-in related events in accordance with the modified schedule of check-in events of the revised compliance program.

* * * * *

UNITED STATES PATENT AND TRADEMARK OFFICE
CERTIFICATE OF CORRECTION

PATENT NO. : 11,507,909 B2
APPLICATION NO. : 17/326085
DATED : November 22, 2022
INVENTOR(S) : Robert Todd Jones et al.

It is certified that error appears in the above-identified patent and that said Letters Patent is hereby corrected as shown below:

In the Claims

In Claim 1, Column 20, Line 35 should read as follows:
"… recording, by the monitoring computer in response to …."

In Claim 1, Column 20, Line 57 should read as follows:
"… determining, by the monitoring computer based on the …"

In Claim 9, Column 21, Lines 55-56 should read as follows:
"… transmit, to the monitoring computer, by way of the telecommunications network transmitted …"

In Claim 9, Column 22, Lines 11-12 should read as follows:
"… notify the tracked person, via the mobile client device, of check-in related events, the check-in related events …"

In Claim 9, Column 22, Lines 51-55 should read as follows:
"… record, in response to determining that the tracked person has missed the check-in-related event, a check-in-related violation in the violation data associated with the tracked person;"

In Claim 12, Column 23, Lines 26-28 should reads as follows:
"The system of claim 9, wherein the mobile client device comprises a wearable device having GPS and cellular capabilities."

Signed and Sealed this
Thirty-first Day of January, 2023

Katherine Kelly Vidal
*Director of the United States Patent and Trademark Office*